US012531925B2

(12) United States Patent
Huh et al.

(10) Patent No.: US 12,531,925 B2
(45) Date of Patent: Jan. 20, 2026

(54) HYBRID OVERLAY MANAGEMENT SERVER MANAGING SERVICES OF HYBRID OVERLAY NETWORK AND METHOD FOR OPERATING THE SAME

(71) Applicant: ELECTRONICS AND TELECOMMUNICATIONS RESEARCH INSTITUTE, Daejeon (KR)

(72) Inventors: Mi Young Huh, Sejong-si (KR); Changkyu Lee, Daejeon (KR); Wook Hyun, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 29 days.

(21) Appl. No.: 18/764,532

(22) Filed: Jul. 5, 2024

(65) Prior Publication Data

US 2025/0023944 A1 Jan. 16, 2025

(30) Foreign Application Priority Data

| Jul. 13, 2023 | (KR) | 10-2023-0091058 |
| Sep. 20, 2023 | (KR) | 10-2023-0125506 |
| Sep. 27, 2023 | (KR) | 10-2023-0130940 |
| Oct. 16, 2023 | (KR) | 10-2023-0138012 |
| Mar. 25, 2024 | (KR) | 10-2024-0040407 |
| Jul. 2, 2024 | (KR) | 10-2024-0087124 |

(51) Int. Cl.
*H04L 67/1042* (2022.01)
*H04L 9/40* (2022.01)
*H04L 67/51* (2022.01)

(52) U.S. Cl.
CPC ......... *H04L 67/1042* (2013.01); *H04L 67/51* (2022.05); *H04L 63/10* (2013.01)

(58) Field of Classification Search
CPC ...... H04L 67/1042; H04L 67/51; H04L 63/10
(Continued)

(56) References Cited

U.S. PATENT DOCUMENTS

2021/0099384 A1* 4/2021 Hyun .................... H04L 67/141

FOREIGN PATENT DOCUMENTS

| CN | 110035440 A | 7/2019 |
| CN | 111222143 A | 6/2020 |

\* cited by examiner

*Primary Examiner* — Wing F Chan
*Assistant Examiner* — Leon Y Tseng
(74) *Attorney, Agent, or Firm* — LRK PATENT LAW FIRM

(57) ABSTRACT

Hybrid overlay management server (HOMS) that manages a service of hybrid overlay network (HON) and a method of operating the HOMS are disclosed. The method includes: receiving a creation request for creating an HON and a service from a peer of a service owner; creating the HON and creating service information of the service; transmitting the service information to the peer of the service owner; receiving a join request for joining the HON and the service from a peer of a service user who intends to use the service; and verifying an access right of the service user, allowing the join request, and transmitting the service information to the peer of the service user, wherein the HON is a peer-to-peer overlay network over which joined peers exchange data, and the service is provided to the peer of the joined service user through the HON.

20 Claims, 26 Drawing Sheets

(58) Field of Classification Search
USPC .......................................................... 709/205
See application file for complete search history.

| HTTP method | POST | | | |
|---|---|---|---|---|
| HTTP URI | http://[HOMS-FQDN]:[port]/homs | | | |
| BODY | Overlay | OVERLAY_INFO | | |
| | | Keyword | Type | m/o |
| | | owner-id | STRING | m |
| | | auth | OVERLAY_AUTH | m |
| | | service-info | OVERLAY_SERVICE_INFO | m |

FIG. 13

| SERVICE_INFO | | |
|---|---|---|
| Keyword | Type | m/o |
| start-datetime | STRING | o |
| end-datetime | STRING | o |
| title | STRING | o |
| description | STRING | o |
| source-list | LIST[STRING] | o |
| block-list | LIST[STRING] | o |
| channel-list | LIST[OVERLAY_CHANNEL_INFO] | m |

| HTTP response code | rsp_code | | | |
|---|---|---|---|---|
| BODY | Overlay | OVERLAY_INFO | | |
| | | Keyword | Type | m/o |
| | | overlay-id | STRING | m |
| | | owner-id | STRING | m |
| | | auth | OVERLAY_AUTH | c |
| | | service-info | OVERLAY_SERVICE_INFO | m |

FIG. 15

| SERVICE_INFO 1600 | | |
|---|---|---|
| Keyword | Type | m/o |
| start-datetime | STRING | m |
| end-datetime | STRING | m |
| title | STRING | c |
| description | STRING | c |
| source-list | LIST[STRING] | m |
| block-list | LIST[STRING] | m |
| channel-list | LIST[OVERLAY_CHANNEL_INFO] | m |

FIG. 16

| HTTP method | PUT | | | |
|---|---|---|---|---|
| HTTP URI | http://[HOMS-FQDN]:[port]/homs | | | |
| BODY | Overlay | OVERLAY_INFO | | |
| | | Keyword | Type | m/o |
| | | overlay-id | STRING | m |
| | | owner-id | STRING | m |
| | | auth | OVERLAY_AUTH | m |
| | | service-info | OVERLAY_SERVICE_INFO | o |
| | Ownership | Keyword | Type | m/o |
| | | owner-id | STRING | m |
| | | admin-key | STRING | m |

| SERVICE_INFO ||| 1900 |
|---|---|---|
| Keyword | Type | m/o |
| start-datetime | STRING | o |
| end-datetime | STRING | o |
| title | STRING | o |
| description | STRING | o |
| source-list | LIST[STRING] | o |
| block-list | LIST[STRING] | o |
| channel-list | LIST[OVERLAY_CHANNEL_INFO] | o |

FIG. 19

| HTTP response code | rsp_code | | | |
|---|---|---|---|---|
| BODY | Overlay | OVERLAY_INFO | | |
| | | Keyword | Type | m/o |
| | | overlay-id | STRING | m |
| | | owner-id | STRING | m |
| | | auth | OVERLAY_AUTH | m |
| | | service-info | OVERLAY_SERVICE_INFO | o |

FIG. 20

| SERVICE_INFO | | |
|---|---|---|
| Keyword | Type | m/o |
| start-datetime | DATETIME | c |
| end-datetime | DATETIME | c |
| title | STRING | c |
| description | STRING | c |
| source-list | LIST[STRING] | c |
| block-list | LIST[STRING] | c |
| channel-list | LIST[OVERLAY_CHANNEL_INFO] | c |

| Service control notification type (control-type) | Structure information |
|---|---|
| 2410: TYPE_NOTIFICATION | {<br>"channel-id": STRING,<br>"media-type": STRING,<br>"control-type": STRING,<br>"SERVICE_INFO": {<br>　"service-type": STRING<br>}<br>} |
| 2420: EXPULSION_NOTIFICATION | {<br>"channel-id": STRING,<br>"media-type": STRING,<br>"control-type": STRING,<br>"candidate-path": STRING,<br>"EXPULSION_INFO": {<br>　"included-block-list": [<br>　　"peer-id": STRING<br>　],<br>　"excluded-block-list": [<br>　　"peer-id": STRING<br>　]<br>}<br>} |
| 2430: PEERLIST_NOTIFICATON | {<br>"channel-id": STRING,<br>"media-type": STRING,<br>"control-type": STRING,<br>"PEERLIST_INFO":{<br>　"included-peer-list": [<br>　　"peer-id": STRING<br>　],<br>　"excluded-peer-list": [<br>　　"peer-id": STRING<br>　]<br>}<br>} |
| 2440: TRANSMISSION_CONTROL_NOTIFICATION | {<br>"channel-id": STRING,<br>"media-type": STRING,<br>"control-type": STRING,<br>"SOURCE_LIST": {<br>　"service-src-list": [<br>　　{"peer-id":STRING<br>　}],<br>　"channel-src-list": [<br>　　{"channel-id":STRING,<br>　　"source-list": [<br>　　　{"peer-id":STRING<br>　　}]<br>　}]<br>}<br>} |

FIG. 24

HYBRID OVERLAY MANAGEMENT SERVER MANAGING SERVICES OF HYBRID OVERLAY NETWORK AND METHOD FOR OPERATING THE SAME

CROSS-REFERENCE TO RELATED APPLICATIONS

This application claims priority to Korean Patent Application No. 10-2023-0091058 filed on Jul. 13, 2023, No. 10-2023-0125506 filed on Sep. 20, 2023, No. 10-2023-0130940 filed on Sep. 27, 2023, No. 10-2023-0138012 filed on Oct. 16, 2023, No. 10-2024-0040407 filed on Mar. 25, 2024, and No. 10-2024-0087124 filed on Jul. 2, 2024, which are hereby incorporated by reference in their entirety into this application.

BACKGROUND

1. Technical Field

A hybrid overlay management server (HOMS) managing services of a hybrid overlay network (HON) and a method of operating the HOMS are disclosed.

2. Description of Related Art

An overlay network, which refers to a virtual network between terminals generated on top of an existing network, may improve services provided to terminals on the existing network. The overlay network may be classified into a mesh-based overlay network and a tree-based overlay network according to its implementation.

The mesh-based overlay network may enable fast transmission and reception of large files in a non-real-time manner but may not be suitable for real-time data transmission. In other words, the mesh-based overlay network may be more reliable and scalable but may not be suitable for real-time live services.

The tree-based overlay network may enable fast data transmission in real time, but configuring a tree and maintaining and repairing the tree may not be easy. In addition, many peers may not receive data if a peer in the middle of the tree disappears, and it may fail to provide a recovery function.

To compensate for these challenges, studies are ongoing on a hybrid overlay network (HON) that combines the mesh-based overlay network and the tree-based overlay network to facilitate real-time data transmission for live services.

SUMMARY

Various embodiments are provided to create a hybrid overlay network (HON) and create and modify services provided over the HON.

Various embodiments are provided to create and modify an access right to an HON and services and allow or disallow a request to join from a peer of a service user.

Various embodiments are provided to change a service type of a service provided over an HON or create or modify a data control right and the like.

Other objects and advantages of the present disclosure will be understood from the following description and will become more apparent from the embodiments of the present disclosure. It will also be readily apparent that the objects and advantages of the present disclosure may be realized by the means and their combinations described in the appended claims.

According to an embodiment, there is provided a method of operating a hybrid overlay management server (HOMS), the method including: receiving a creation request for creating a hybrid overlay network (HON) and a service from a peer of a service owner; in response to the creation request, creating the HON and creating service information of the service; transmitting the service information to the peer of the service owner; receiving a join request for joining the HON and the service from a peer of a service user who intends to use the service; and verifying an access right of the service user, allowing the join request, and transmitting the service information to the peer of the service user, wherein the HON may be a peer-to-peer (P2P) overlay network over which joined peers exchange data, and the service may be provided to the peer of the joined service user through the HON.

The creating of the service information may include determining attributes of the HON and the service, using parameters included in the creation request.

The creating of the service information may include: determining at least one of a service type of the service or a user-specific access right, using parameters included in the creation request, wherein the service type may include an open type and a closed type based on whether an access right is required to use the service.

The service information may include: a list of peers having a transmission right, a list of peers blocked from participation, and a list of channels configuring the service, in connection with the access right.

The creating of the service information may include: determining a priority of a data transmission right for each channel to be higher than that of a data transmission right assigned collectively to all channels in the service.

The method may further include: when the service information is created, transmitting the created service information to the peer of the service user in response to an information retrieval request from the service user.

The service may include a feature-based video service.

According to an embodiment, there is provided a method of operating an HOMS, the method including: receiving a modification request for modifying service information provided through an HON from a peer of a service owner; in response to the modification request, verifying a modification right of the service owner for the service information; in response to the modification right being present, modifying the service information according to the modification request; and in response to the service information being retrieved by a peer of a service user joining the service, transmitting the retrieved service information to the peer of the service user, wherein the HON may be a P2P overlay network over which joined peers exchange data, and the peer of the service owner may transmit, to the peer of the service user, a message indicating that access control information of the service has been modified.

The modifying of the service information may include modifying at least one of a start time, an end time, a data transmission right, and a service join right of the HON, according to the modification request.

The modifying of the service information may include changing a service type of the service from an open type to a closed type, or from the closed type to the open type.

The modifying of the service information may include: in response to the service type being changed from the closed type to the open type, allowing a join request from the peer of the service user without verifying an access-key of the service user and a list of peers having an access right; and in response to the service type being changed from the open type to the closed type, applying, to the service, the access-key and the list of peers having the access right.

The peer of the service owner may transmit, to the peer of the service user, at least one of the following: a message indicating that the service type has changed, a message indicating that a list of peers blocked from joining has changed, a message indicating that a list of peers allowed to join has changed, and a message indicating that a list of peers having a data transmission right has changed.

According to an embodiment, there is provided a HOMS including: a processor; and a memory storing instructions, wherein, when executed by the processor, the instructions may cause the HOMS to: receive a creation request for creating an HON and a service from a peer of a service owner; in response to the creation request, create the HON and create service information of the service; transmit the service information to the peer of the service owner; receive a join request for joining the HON and the service from a peer of a service user who intends to use the service; and verify an access right of the service user, allow the join request, and transmit the service information to the peer of the service user, wherein the HON may be a P2P overlay network over which joined peers exchange data, and the service may be provided to the peer of the joined service user through the HON.

When executed by the processor, the instructions may cause the HOMS to determine attributes of the HON and the service, using parameters included in the creation request.

When executed by the processor, the instructions may cause the HOMS to: determine at least one of a service type of the service or a user-specific access right using the parameters included in the creation request, and the service type may include an open type and a closed type based on whether an access right is required to use the service.

The service information may include a list of peers having a transmission right, a list of peers blocked from joining, and a list of channels configuring the service, in connection with the access right.

When executed by the processor, the instructions may cause the HOMS to determine a priority of a data transmission right for each channel to be higher than that of a data transmission right assigned collectively to all channels in the service.

When executed by the processor, the instructions may cause the HOMS to: in response to the service information being modified, transmit the modified service information to the peer of the service user in response to an information retrieval request from the service user.

The service may include a feature-based video service.

Advantageous Effects

Various embodiments may be provided to enable free changes of a service access right type during a service provided over a hybrid overlay network (HON).

Various embodiments may be provided to enable free changes of a closed-type user access right and a data transmission right and enable convenient control of a data transmission right between a service session and a channel.

Various embodiments may be provided to reflect the situation of a site where a service is provided and provide flexibility that enables various changes of a service type or access, and to provide various forms and types of services in private broadcasts or metaverses.

BRIEF DESCRIPTION OF DRAWINGS

FIG. 13 is a diagram illustrating a service creation request message according to an embodiment.

FIG. 14 is a diagram illustrating service information of a service creation request message according to an embodiment.

FIG. 15 is a diagram illustrating a response message to service creation according to an embodiment.

FIG. 16 is a diagram illustrating service information of a response message to service creation according to an embodiment.

FIG. 18 is a diagram illustrating an HON and service information modification request message according to an embodiment.

FIG. 19 is a diagram illustrating service information of an HON and service information modification request message according to an embodiment.

FIG. 20 is a diagram illustrating a response message to service information modification according to an embodiment.

FIG. 21 is a diagram illustrating service information of a response message to service information modification according to an embodiment.

FIG. 24 is a diagram illustrating a type-specific structure for modifying service information according to an embodiment.

DETAILED DESCRIPTION

Figure 1:
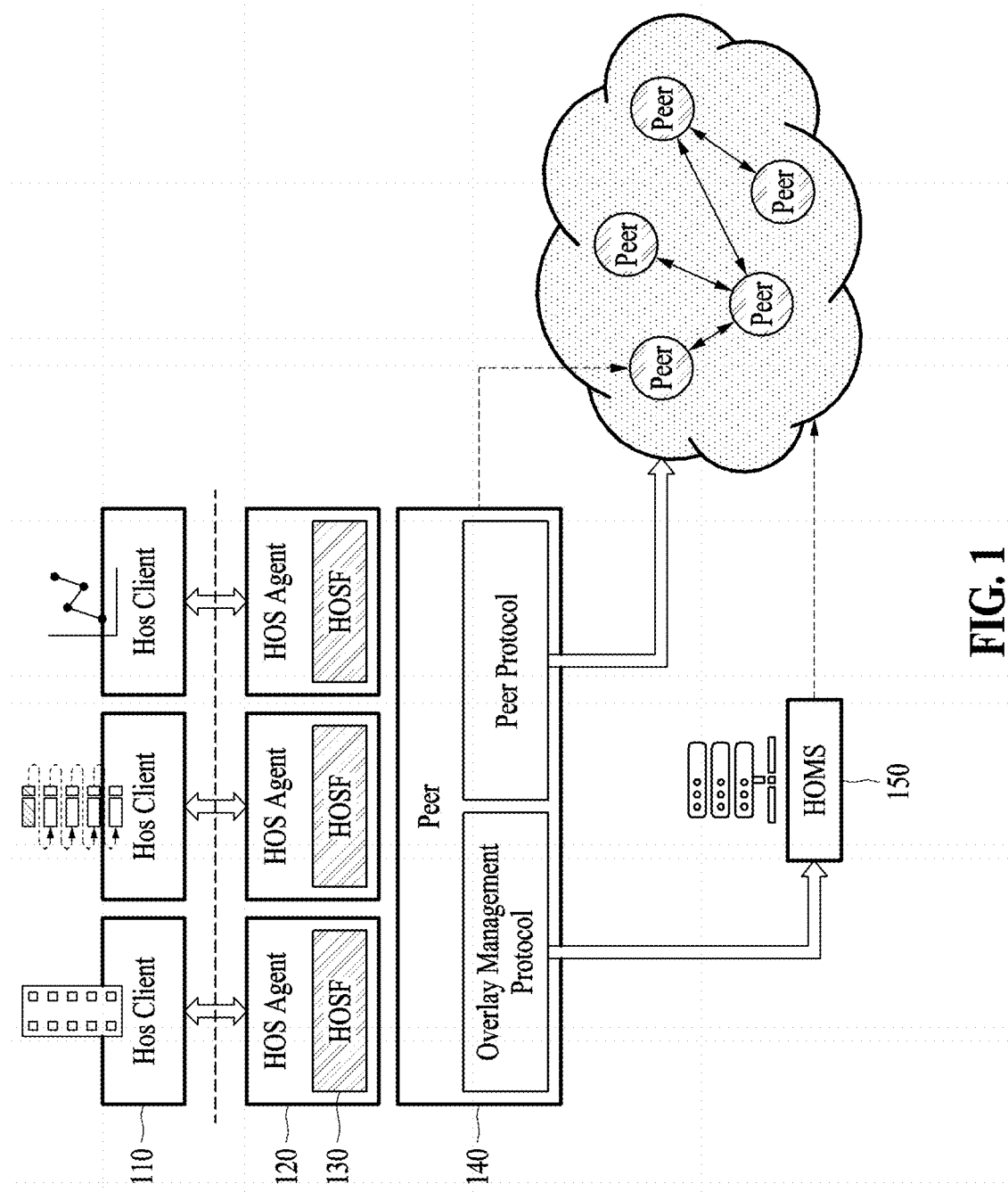
FIG. 1 is a diagram illustrating a structure where a service is provided over a hybrid overlay network (HON) according to an embodiment.

The following structural or functional descriptions of embodiments are provided only for the purpose of describing the embodiments, and the embodiments may be implemented in various forms. The actual implementations are not limited by some particular embodiments described herein, but the scope of this disclosure includes various modifications, equivalents, and alternatives included in the technical ideas embodied by the embodiments of the disclosure.

As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. The terminology used herein is for describing various examples only and is not to be used to limit the disclosure. Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component.

It will be understood that, when a component is referred to as being "connected to" another component, the component can be directly connected or coupled to the other component, or intervening components may be present therebetween.

The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, the embodiments will be described in detail with reference to the accompanying drawings. When describing the examples with reference to the accompanying drawings, like reference numerals refer to like components and a repeated description related thereto is omitted.

FIG. 1 is a diagram illustrating a structure where a service is provided over a hybrid overlay network (HON) according to an embodiment.

Referring to FIG. 1, illustrated is an example structure including a service client 110, a service agent 120, a service framework 130, a peer 140, and a hybrid overlay management server (HOMS) 150, in which a service is provided over an HON to the service client 110.

The service client 110 may refer to a client of a service owner who desires to create a service through the HON or a service user who desires to receive the service. In other words, the service owner or the service user may communicate with the HOMS 150 via the service client 110 to create or access the HON. In this description, an owner of a service may also be referred to as a service owner as described herein for ease of explanation. In this description, a service provided through the HON may also be referred to as a hybrid overlay service (HOS) or simply as a service for ease of explanation. In this description, the service client 110 may also be referred to as an HOS client or simply as a client for ease of explanation.

The peer 140 may refer to a communication node on a peer-to-peer (P2P) network that functions simultaneously as both a client and a server with respect to other nodes on the network.

A P2P system may refer to a system in which nodes in the system share resources to provide services supported by the system. The nodes in the system may both provide services to other nodes or may request services from other nodes. The peer 140 may be a node in the P2P system.

The HON may refer to a P2P overlay network in which joined (or participating) peers exchange data using a pull-and-push method. That is, the HON may organize and maintain a tree-type path that pushes data to all peers without loops and fetches data from other peers simultaneously. The HON may include a distributed overlay network. In this description, the HON may also be referred to as an overlay network or simply as an overlay, for ease of explanation.

The HON may also be a network in which a tree-based overlay network and a mesh-based overlay network are combined to facilitate real-time data transmission for live services. In the HON, various services may be provided. In this case, which service corresponds to data transmitted over the HON and how to organize a detailed data transmission method to provide each service may be important. Further, controlling a user who is allowed to access a service and a user who has a data transmission right (or permission) may also be important.

To a single HON, multiple service clients and service agents may be connected. Although only three service clients are illustrated in FIG. 1, examples are not limited thereto, and there may be one or more service clients. Also, the number of service clients may determine the number of service agents, service frameworks, and peers included in a single HON.

A hybrid peer may also refer to the peer 140 that may exchange data using mesh-based and tree-based methods executed on the HON. In this description, the hybrid peer may also be referred to as the peer 140 or HPEER for ease of explanation.

The HOS may be based on a hybrid P2P (HP2P) network. The HP2P network may distribute real-time data to a plurality of peers and provide a distributed service network required for video conferencing, blockchain, broadcasting, gaming, and the like.

As shown in FIG. 1, a hybrid overlay service framework (HOSF) may be located between an HOS and an HON. The service framework 130 may use the HON using protocols. For example, the service framework 130 may use a peer protocol or an overlay management protocol. The HOSF may be the service framework 130 based on the HON, which may define how to use the functionalities and features of the HP2P network to provide various types of services. In this description, the HOSF may also be referred to herein as the service framework 130 for ease of explanation.

An HOS agent based on the service framework 130 may control the HON and provide abstract application programming interfaces (APIs) to an HOS client. In this manner, the HOS client may not need to know specific underlying protocols. However, the peer 140 may be unaware of executed services and provide methods for manipulating the HON and exchanging data among peers. The service framework 130 may also specify the functionalities to be implemented by the HOS agent that are not supported by an underlying HON. In this description, the HOS agent may also be referred to as the service agent 120 for ease of explanation.

FIG. 1 illustrates an architectural overview of an HOSF, and a relationship among a user, an HOS client, peers, and an HOS agent may be as follows. In this description, the user may include a service owner, a service user, and a service participant.

The user of the HP2P network may either request or provide services.

The HOS client may initiate a service request, for example, creating, querying, joining (i.e., participating), modifying, and deleting services, to the HOMS of the HP2P network through the HOS agent.

The HOS agent may provide functions as per the service framework 130 to make the peer 140 propagate messages from clients to the HON, and it may also pass over the message from the network to the clients.

The HOMS may manage information of the HON and the HOS for creating, querying, joining, modifying, and terminating the services for the HOS client.

The peer 140 may be a communication node communicating with other communication nodes in the HP2P network in which it has client and server roles, by using protocols.

Figure 2:
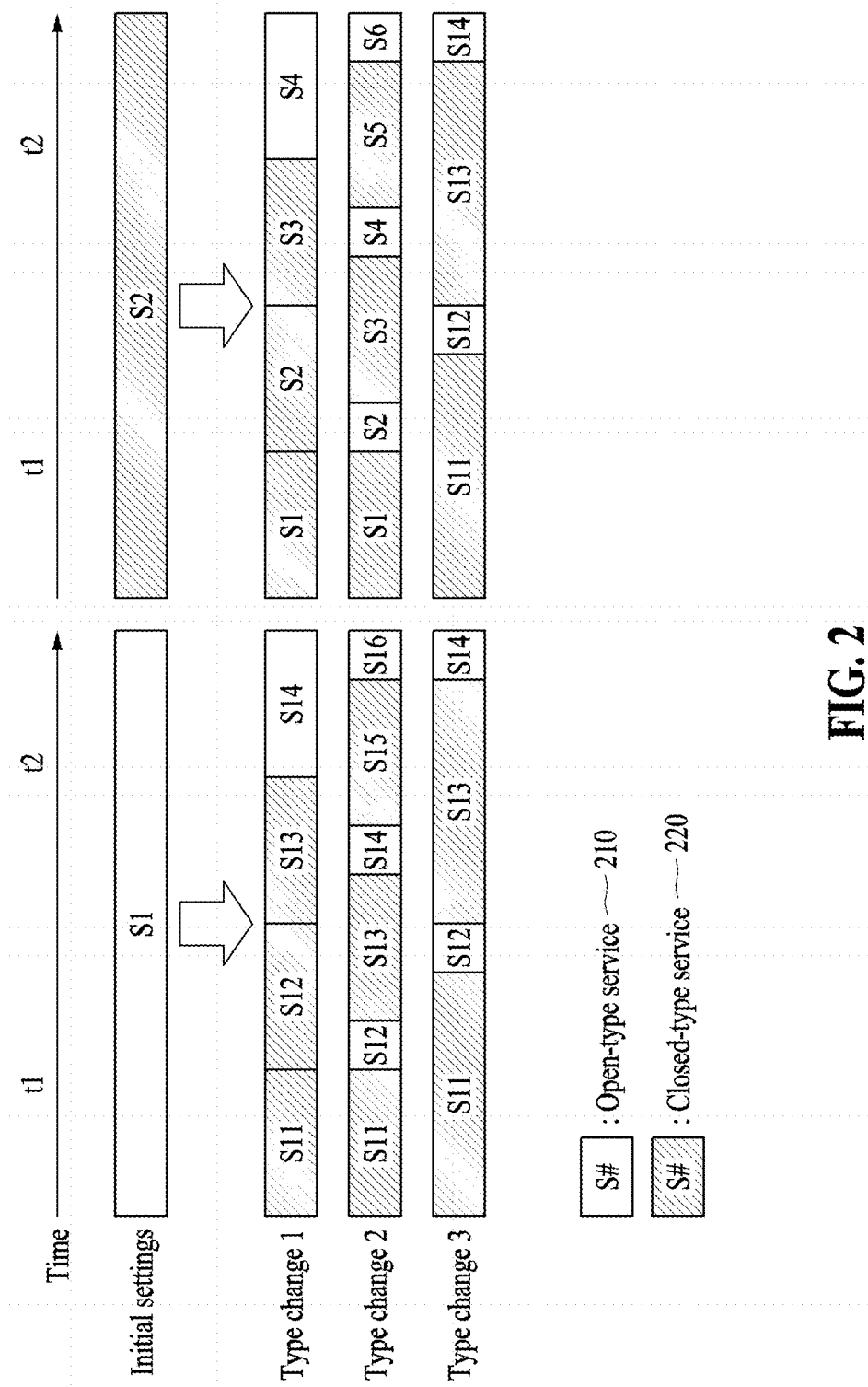
FIG. 2 is a diagram illustrating an operation of changing a service type according to an embodiment.

FIG. 2 is a diagram illustrating an operation of changing a service type according to an embodiment.

Referring to FIG. 2, illustrated is an example where a service type is freely changed between an open-type service 210 and a closed-type service 220. In this description, the open-type service 210 may also be referred to as an open service or an open type, and the closed-type service 220 may also be referred to as a closed service or a closed type, for ease of explanation.

A service provided over an HON may include, for example, a feature-based video service, but embodiments are not limited thereto, and various forms and types of services may be provided through the network.

In the feature-based video service, a transmitting terminal that provides the service may extract and transmit features of a video image that change after transmitting a reference image, and a receiving terminal that receives the service may combine feature information and the reference image to create a video image. Thus, an amount of data to be transmitted between terminals may be reduced.

An access right to access a service in the HON may be specified through a service type of the service. The service type may be classified into a closed type and an open type. The closed type may allow access only by specific authorized users (i.e., user terminals or devices), whereas the open type may allow access by any user (i.e., user terminals or devices). The service type may remain unchanged until the termination once it is determined at the beginning of the service, leaving the provided service in the hands of a responsible service operator.

However, in the case of a private broadcast or metaverse, the flexibility in user access control may be useful to vary an access right of a user joining the service by reflecting a situation on a site where the service is provided.

Accordingly, to support the flexibility in user access control, a HOMS may change the service type from the open-type service 210 to the closed-type service 220, or from the closed-type service 220 to the open-type service 210, as shown in FIG. 2. For example, in the example shown on the left side of FIG. 2, for a service initially established as the open-type service 210, the service type may change over time, as shown, for example, type change 1, type change 2, or type change 3. Similarly, in the example shown on the right side of FIG. 2, for a service initially established as the closed-type service 220, the service type may change over time, as shown, for example, type change 1, type change 2, or type change 3. Although only three forms of changing the service type are illustrated in FIG. 2, embodiments are not limited thereto, and the service type may change unrestrictedly in any form over time or at the request of a user.

In the case of changing a service type of a service initially established as an open type to a closed type during the course of the service, it may be necessary to experience a complicated process of allowing all users joining the service to leave the overlay network of the existing open service and allowing them all to rejoin the overlay network of the newly established closed service. Alternatively, the same process may apply in a converse case of changing a service type of a service initially established as a closed type to an open type during the course of the service. In particular, for a service whose service type is changed repeatedly between the closed type and the open type during the course of the service, it may be more complicated to provide the service and difficult to maintain consistency of the service.

According to an embodiment, the HOMS may change the service type set at an initial stage of establishing a service, even during the course of the service. It may require a signaling method and a specific message formatting method for user access right control including access control of users, data transmission right control, and a notification method of notifying such modification information to participants in a distributed environment according to the change in the service type.

According to an embodiment, there may be provided a service provided over an HON and a detailed data transmission structure configured to provide the service; a structure for describing which users are accessible to the service or which users have data transmission rights; a notification function for notifying the creation, modification, and modification information of the service type, the users, and data control rights; and a signaling method and a message format for providing the service.

For example, according to an embodiment, there may be provided, in a feature-based video service executed on the HON, service type control, user access control, data transmission control, control information notification, and specific message formats. In other words, the following capabilities for a service may be provided.

Provide a function to change a service type set at an initial stage of a service while the service is in progress Provide a function to change a user access right based on the change in service type Provide a function to change a data transmission right (or permission)

Figure 3:
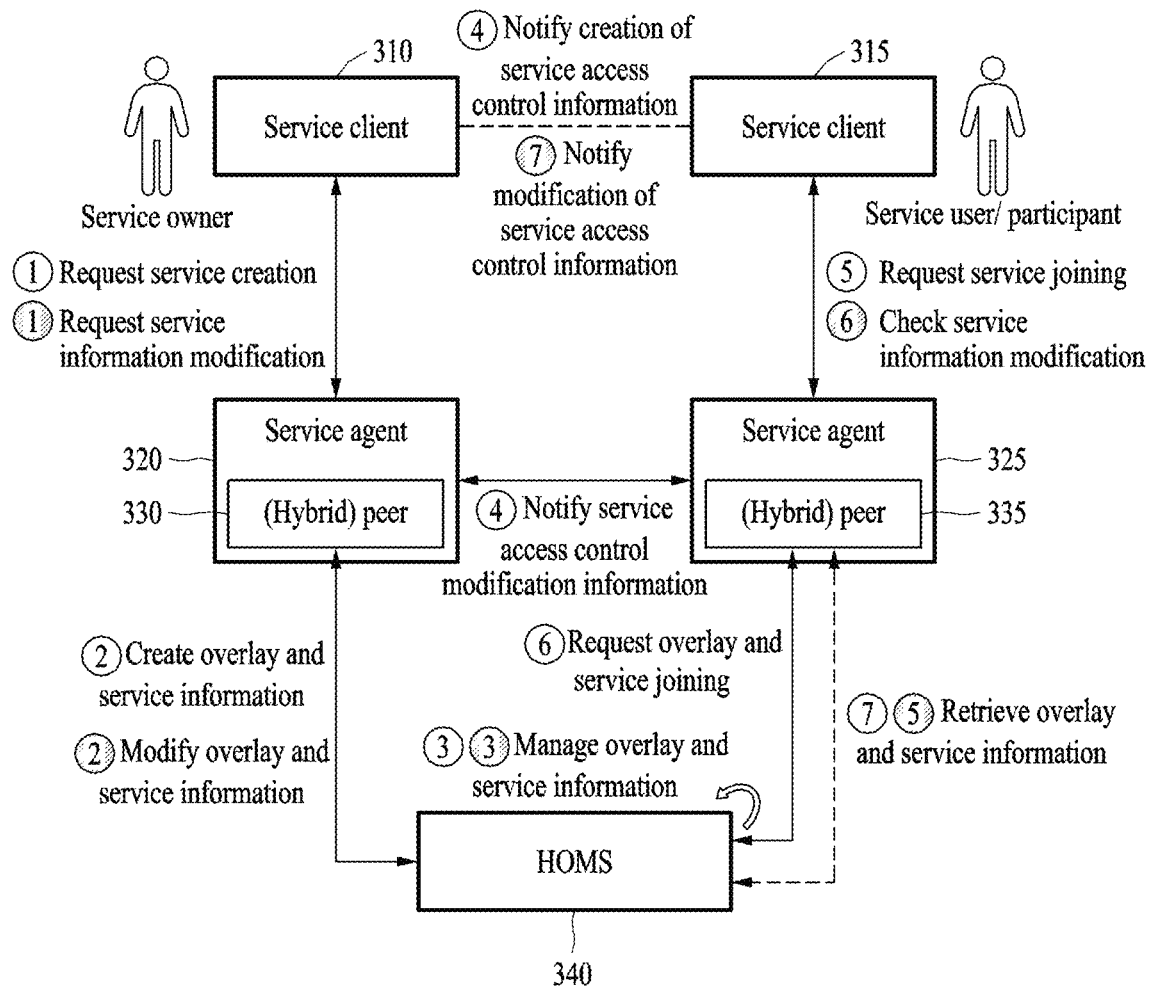
FIG. 3 is a diagram illustrating a structure where a service is provided through a service client, a service agent, a peer, and a hybrid overlay management server (HOMS), according to an embodiment.

Provide a function to notify service participants of modified control information FIG. 3 is a diagram illustrating a structure of a service client, a service agent, a peer, and a HOMS, according to an embodiment.

Referring to FIG. 3, illustrated are an example structure and operations among service clients 310 and 315, service agents 320 and 325, peers 330 and 335, and a HOMS 340 to create and modify a service and an access right to the service. In FIG. 3, the service client 310, the service agent 320, and the peer 330 may be representative of a service owner, and the service client 315, the service agent 325, and the peer 335 may be representative of a service user. In this description, the service user may also be referred to as a user or a service participant for ease of explanation.

In an HON, service access right control may be performed throughout the entire period from the creation of the service to the termination of the service.

A service client (e.g., 310 and 315), a service agent (e.g., 320 and 325), a peer (e.g., 330 and 335), and a HOMS (e.g., 340) have been described above in detail, and thus the description thereof will not be repeated.

In FIG. 3, operations ① through ⑦ may represent a process of creating a service and access right at an initial stage of the establishment of a service, and operations ❶ through ❼ may represent a process of modifying service information and access right after the service is created. The processes and operations will be described in detail below with reference to FIGS. 4 and 5.

Figure 4:
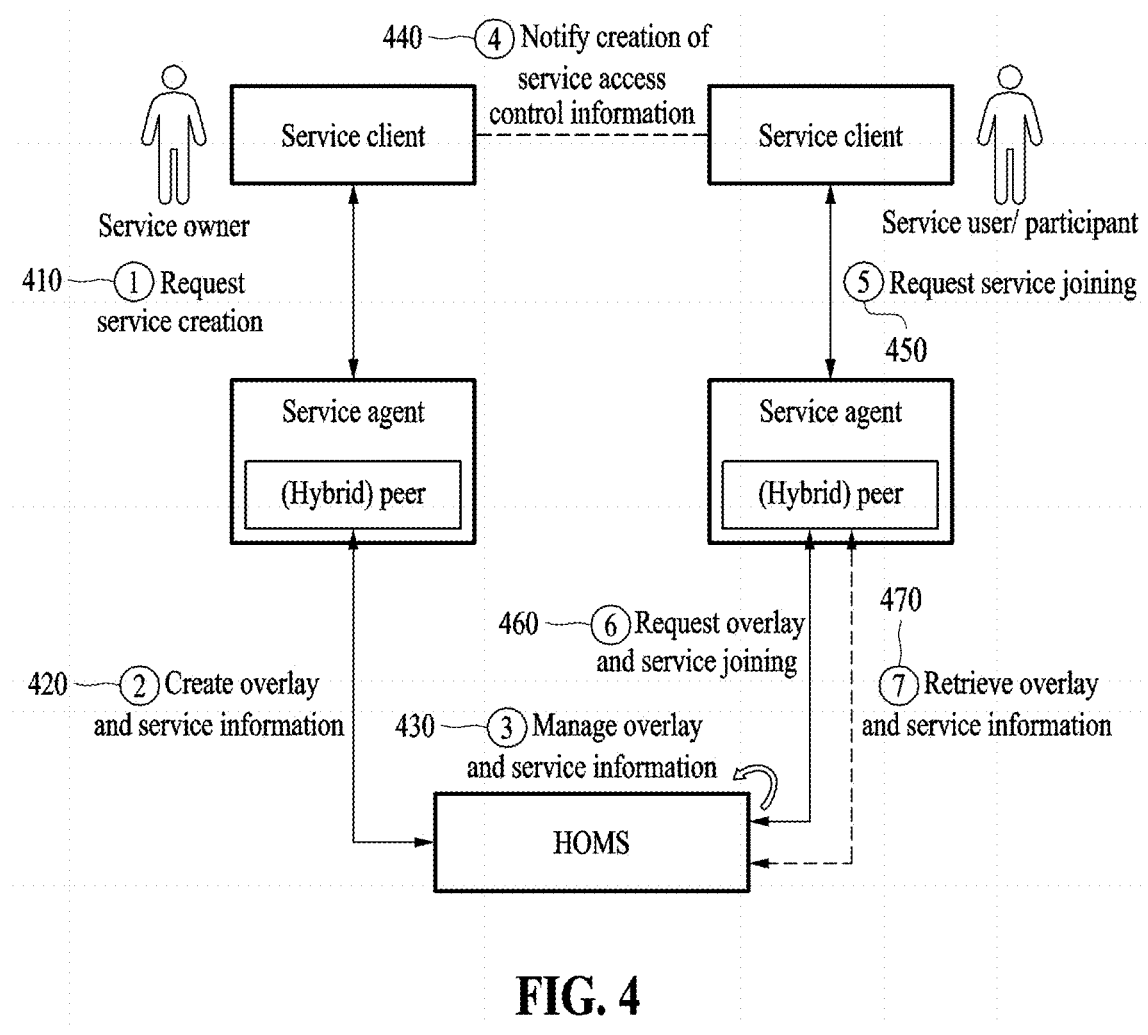
FIG. 4 is a diagram illustrating a process of creating a service and an access right by a HOMS according to an embodiment.

FIG. 4 is a diagram illustrating a process of creating a service and an access right by a HOMS according to an embodiment.

Referring to FIG. 4, illustrated are operations 410 through 470 in a process of creating a service and an access right.

At operation 410, a service owner may make a service creation request to a service agent via a service client.

At operation 420, a peer included in the service agent may transmit an overlay and service information creation request message (HybridOverlayCreation) for creating corresponding service information to the HOMS, and may receive a response message as a confirmation from the HOMS. The service agent may include functions of the peer, and thus the overlay and service information creation request message may be exchanged between the peer and the HOMS.

At operation 430, the HOMS may create the service information including information about the service owner, a service type of the service, authorized service participants, unauthorized service participants, participants in the service having an information transmission right, and the like. The HOMS may then notify the service agent of a creation result and manage the creation result. The exchange of messages related to the overlay and the service information between the service agent and the HOMS may be performed between peers included in the service agent and the HOMS.

At operation 440, after being notified that the service has been created by the service agent, the service owner may notify or inform users authorized to access the service that the access to the service is available. The notification of information may be made via various methods, including via e-mail.

At operation 450, upon receiving such service access information, a service user may make a service join request to the service agent via the service client.

At operation 460, the service agent may transmit a service join request message (HybridOverlayJoin) for joining the overlay and service information to the HOMS, and the HOMS may identify whether such a join requestor is an authorized or unauthorized service participant in the service.

In this case, when the service join requestor is the authorized participant, the HOMS may provide the join requestor (or joiner) with the overlay and service information managed by the HOMS.

At operation 470, when the participation in the service is allowed, the joiner may become a service participant, and the service participant may obtain the overlay and service information that are modified frequently, through an information retrieval request (HybridOverlayQuery) to the HOMS.

Figure 5:
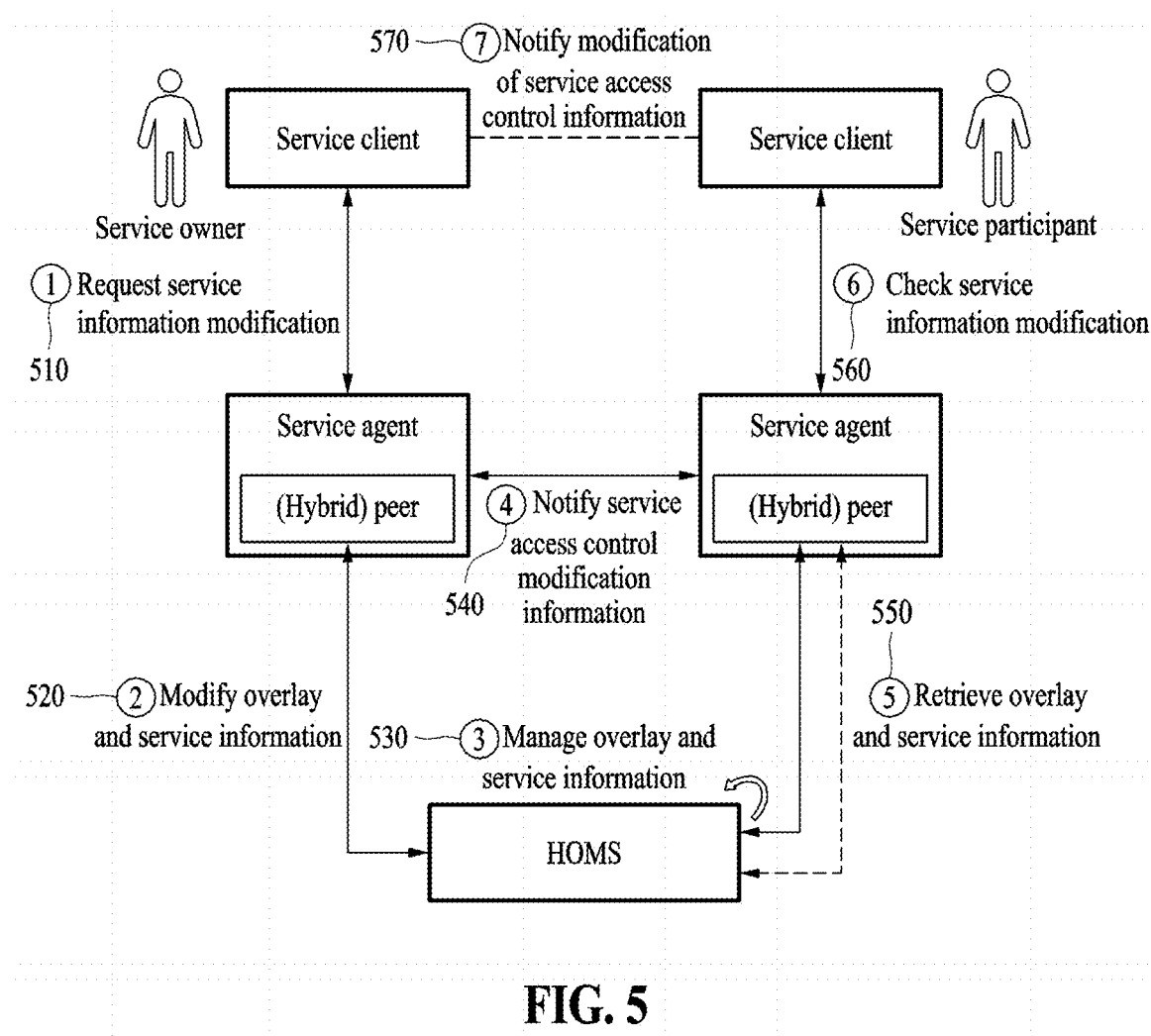
FIG. 5 is a diagram illustrating a process of changing a service type and an access right by a HOMS according to an embodiment.

FIG. 5 is a diagram illustrating a process of changing a service type and an access right by a HOMS according to an embodiment.

Referring to FIG. 5, illustrated are operations 510 through 570 in a process of changing service information and an access right.

At operation 510, a service owner may make a service information modification request to a service agent via a service client.

At operation 520, the service agent may transmit a service modification request message (HybridOverlayModification) including service modification information to a HOMS.

At operation 530, the HOMS may check whether a user is authorized to modify service information and may modify the requested service modification information. In other words, the HOMS may use the requested service modification information to modify the service information to be provided. In this case, the HOMS may check whether the service owner is authorized to modify the service information, and modify and manage the information to be modified, such as, a service type to be changed, a list of authorized service users, a list of unauthorized service users, and a list of users authorized to transmit information in the service.

At operation 540, the service agent of the service owner may provide a notification message (i.e., BROADCAST_DATA including TYPE_NOTIFICATION, EXPULSION_NOTIFICATION, PEERLIST_NOTIFICATION, TRANSMISSION_CONTROL_NOTIFICATION, etc.) to service agents of other participants in the service to notify them that service access control information has modified.

At operation 550, a service agent of a service participant may verify the modified service information from the HOMS via an overlay and service information retrieval message (HybridOverlayQuery).

At operation 560, the information retrieved from the HOMS may be transmitted (or forwarded) to a service client of the service participant, which may notify the service participant that the service information has been modified.

At operation 570, the service owner may then notify the service participants of the modification of the control information, which may not be performed by transmitting (or forwarding) by a specific message, but through a logical flow that allows the owner to notify the participants of the modified information.

Figure 6:
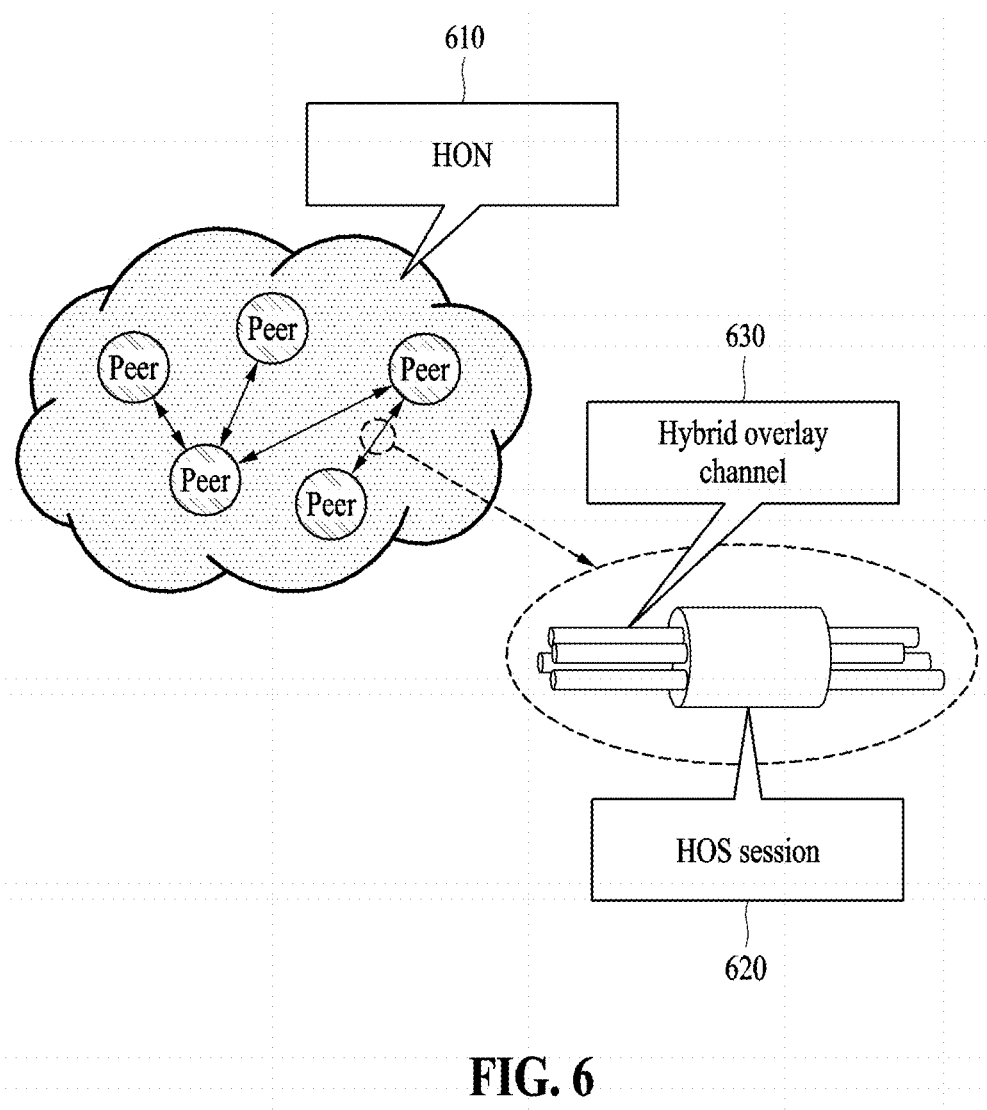
FIG. 6 is a diagram illustrating an HON according to an embodiment.

FIG. 6 is a diagram illustrating an HON according to an embodiment.

Referring to FIG. 6, illustrated is an example structure in which a hybrid overlay channel 630 is included in an HOS session 620 on an HON 610. In this description, for ease of explanation, the HOS session 620 may also be referred to as an overlay session or a service session, and the hybrid overlay channel 630 may also be referred to as an overlay channel or simply a channel.

Between peers of the HON 610, an overlay network may be configured as shown in FIG. 6, and there may be a service session for a service provided over the overlay network. The service session may include a plurality of channels over which various forms of data may be transmitted.

According to an embodiment, the HOS session 620 may reside over one specific HP2P network, and only one service may exist within a single overlay network at any given time. A user may participate in the same HP2P network through multiple peers, indicating that multiple peers may exist with the same user identifier. The HON 610 may have multiple hybrid overlay channels as shown in FIG. 6. This may indicate that a group of peers may organize an HP2P network, and only one service may be active. However, multiple types of data streams may flow through CoreTree of the HP2P network. For example, the HOS session 620 may have three hybrid overlay channels for a conference call consisting of voice, video, control, and text chat.

FIGS. 7 through 10 are diagrams illustrating structures and fields of overlay information for a service according to an embodiment.

information 720, overlay status information 730, overlay service information 740, and overlay channel information 750 that are included in the overlay information 710.

In this description, for ease of explanation, the overlay information 710 may also be referred to as OVERLAY_INFO, the overlay authentication information 720 may also be referred to as OVERLAY_AUTH, the overlay status information 730 may also be referred to as OVERLAY_STATUS, the overlay service information 740 may also be referred to as OVERLAY_SERVICE_INFO, and the overlay channel information 750 may also be referred to as OVERLAY_CHANNEL_INFO.

Table 1 below shows detailed information on each of the fields shown in FIG. 7.

TABLE 1

| Keyword | Type | Description |
| --- | --- | --- |
| overlay-id | STRING | overlay-id is an identifier for a specific HON. |
| title | STRING | title is a human-readable description on the HON. |
| type | STRING | type indicates the type of the HON, and it may be one of "core" or "sub." |
| sub-type | STRING | sub-type indicates the shape of the overlay topology, and it may be one of "tree" or "mesh." |
| owner-id | STRING | owner-id indicates the peer identifier who created the HON. owner-id is composed of a user identifier followed by a semicolon (;), and an instance identifier.<br>The user identifier contains an identifier that may identify the owner.<br>To enhance user convenience, the user identifier may be an email address or other user-provided identifier, depending on the implementation of the service.<br>The instance identifier may be randomly generated on each peer. |
| status | OVERLAY_STATUS | status indicates the status of the HON, such as, the number of peers, peerlist, and human-readable status, for example, "active," "terminated," etc. |
| description | STRING | descriptions provide more detailed information regarding the HON. |
| heartbeat-interval | NUMBER | heartbeat-interval indicates the interval for checking the aliveness of peers. |
| heartbeat-timeout | NUMBER | heartbeat-timeout indicates when a peer decides a corresponding peer is no longer alive. |
| auth | OVERLAY_AUTH | auth includes the authentication information for access control to the HON. |
| cr-policy | CR_POLICY | cr-policy includes caching and recovery policies for the tree and data recovery policies of the HON. |
| service-info | OVERLAY_SERVICE_INFO | service-info may contain service-specific information for the various services running on the HP2P network.<br>For example, for a feature-based video service, service-info may include the start and end dates of the service, the title and description of the service, the specific types of channels that form the service and media transmission information for those channels, and a list of participants with a transmission right for each channel. |

Figure 7:
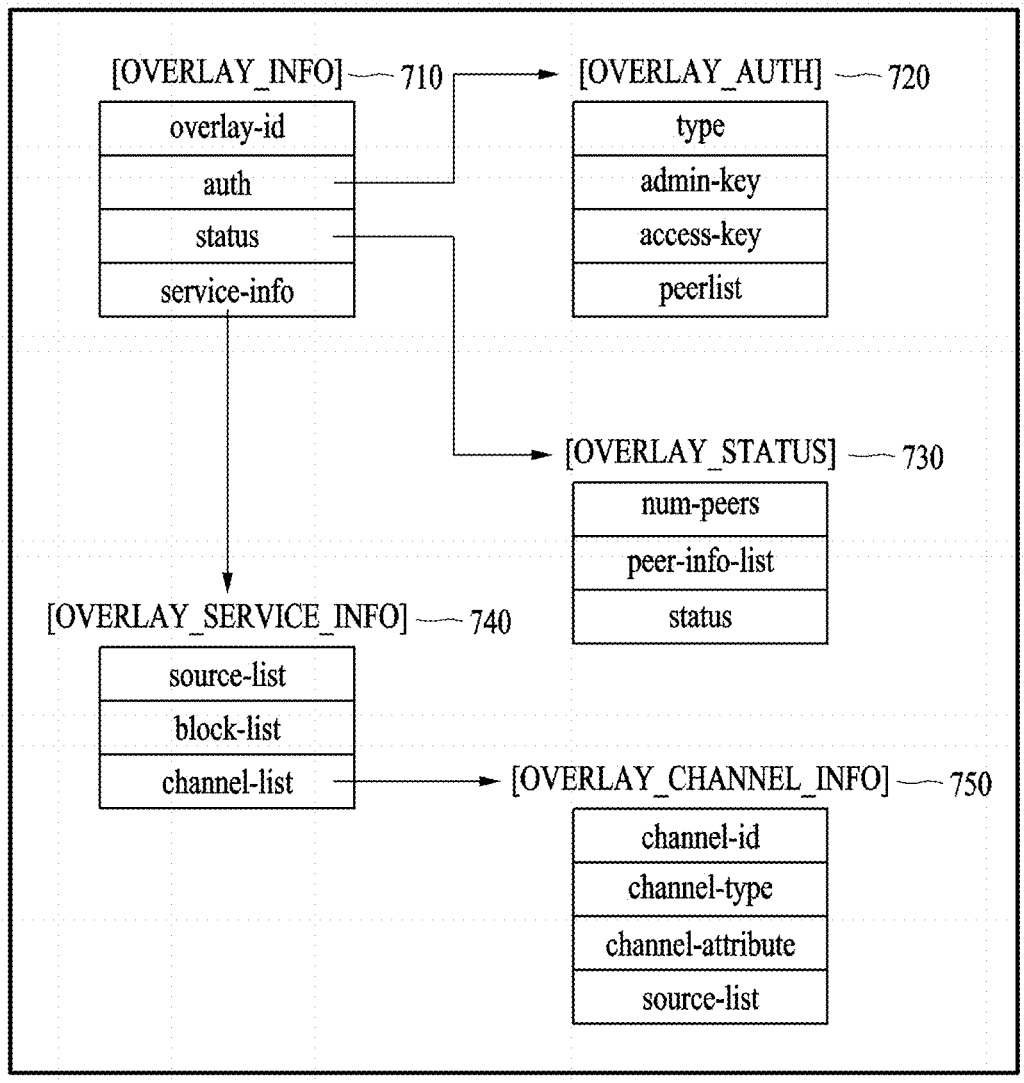
FIGS. 7 through 10 are diagrams illustrating structures and fields of overlay information for a service according to an embodiment.

Referring to FIG. 7, illustrated are example structures and fields of overlay information 710, and overlay authentication Table 2 below shows detailed information on each of the fields of OVERLAY_SERVICE_INFO shown in FIG. 7.

TABLE 2

| Keyword | Type | Description |
| --- | --- | --- |
| start-datetime | STRING | start-datetime is the start date and time of an overlay service. |

TABLE 2-continued

| Keyword | Type | Description |
| --- | --- | --- |
| end-datetime | STRING | end-datetime is the end date and time of the overlay service. |
| title | STRING | title is the name of the service. |
| source-list | LIST[STRING] | source-list includes a list of peer identifiers having data transmission rights (permissions) for all channels of the service.<br>The list includes peer identifiers assigned with a right for transmitting data through all the channels. |
| block-list | LIST[STRING] | block-list includes a list of peer identifiers that are restricted from participating in the overlay network. |
| description | STRING | description includes a more comprehensive explanation of the overlay service. |
| channel-list | LIST [OVERLAY_CHANNEL_INFO] | channel-list indicates a list of information about each channel in the service. |

Table 3 below shows detailed information on each of the fields of OVERLAY_CHANNEL_INFO shown in FIG. 7.

TABLE 3

| Keyword | Type | Description |
| --- | --- | --- |
| channel-id | STRING | channel-id indicates a channel identifier. |
| channel-type | STRING | channel-type indicates the type of channel. |
| channel-attribute | CHANNEL_ATTRIBUTE | channel-attribute describes the attribute information of the channel, such as, the data transfer model. |
| source-list | LIST[STRING] | source-list indicates a list of peer identifiers authorized to transmit data on the channel. In case of conflict with the source-list of SERVICE_INFO, the source-list of OVERLAY_CHANNEL_INFO may have a higher priority. |

Further. PEER_INFO of the peer-info-list shown in FIG. 7 includes a peer identifier, a network address, authentication information, and the like, and Table 4 below shows detailed information on each of the fields.

TABLE 4

| Keyword | Type | Description |
| --- | --- | --- |
| peer-id | STRING | peer-id is an identifier of a hybrid peer including a user identifier followed by a semicolon (;), and an instance identifier. |
| address | STRING | address includes a network address that another peer is able to access. |
| auth | PEER_AUTH | auth includes authentication information needed to establish a connection among peers. |
| expires | NUMBER | expires indicates the time, in seconds, after which the peer will be removed from the HON. |
| ticket-id | NUMBER | ticket-id may be a unique number that a peer receives from the HOMS when it first joins the HON.<br>The HOMS may issue new sequential ticket-id numbers to joined peers. That is, a newly joined peer in the HON may have a higher ticket-id value than a previously joined peer. This may play an important role in ensuring that the HON forms a tree structure, rather than a loop. |

However, each of the information and fields illustrated in FIG. 7 may be provided for illustrative purposes only, and embodiments are not limited thereto. Also, various fields may be further added, and some structures and fields may be omitted.

For example, in a feature-based video service running on an HON, fields related to changing a service type and an access right of a user may be as follows.

Service type: type in auth in the overlay information 710
User access right: access-key and peerlist of auth in the overlay information 710 and block-list in the service information (service-info)

In addition, fields related to the status of the list of participants joining (or participating in) the service, after the service type is changed and a period of time used to change the service type elapses, may be as follows.

Participant list: peer-info-list and status in status in the overlay information 710

In addition, fields related to data transmission rights (or permissions) may be as follows.

Data transmission right: source-list in the service information (service-info) and source-list in the channel information (channel-info)

Figure 8:
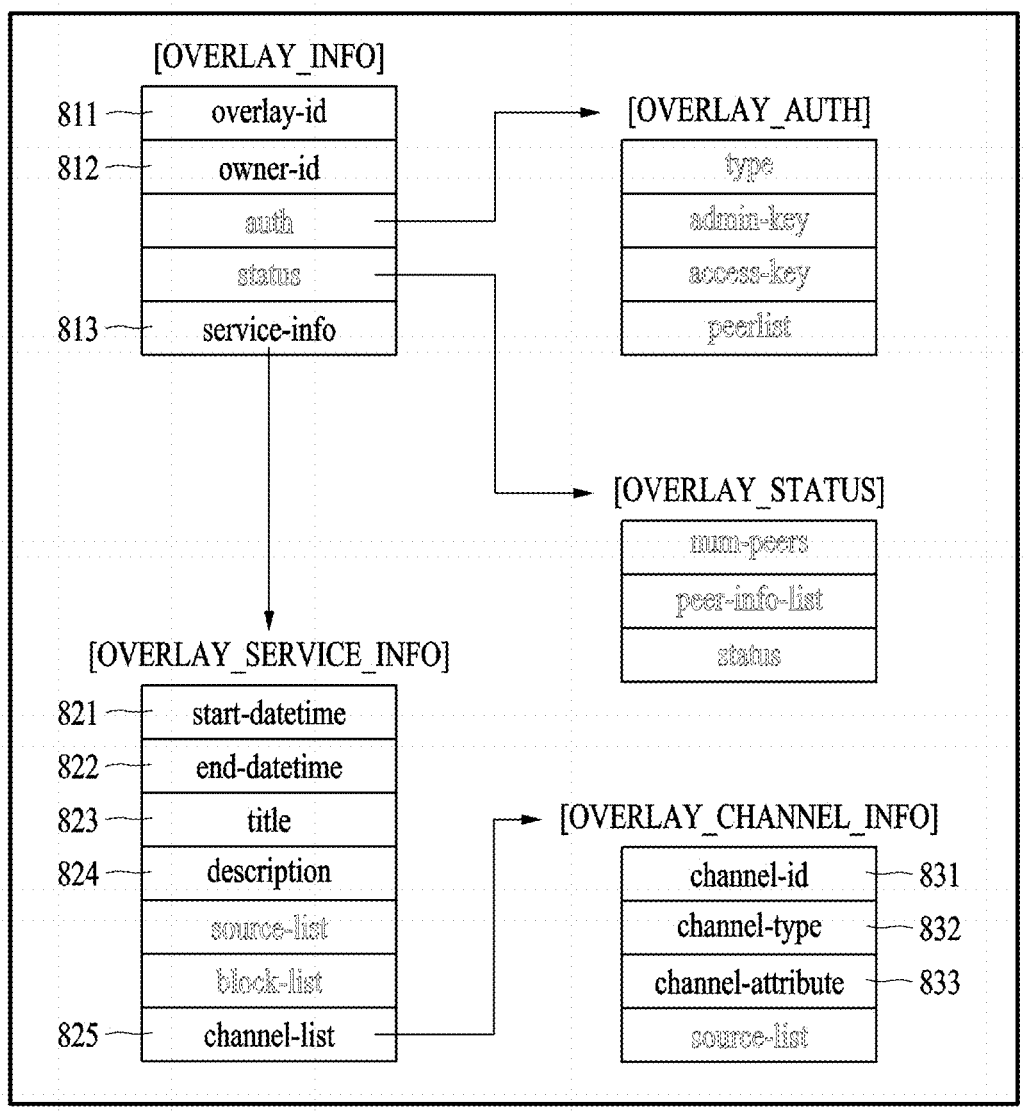

Referring to FIG. 8, illustrated are fields related to a service provided over an HON and the relationship between detailed data transmission channels in the service.

To the overlay information (OVERLAY_INFO) that describes the details of the HON, service information may be added to describe various services provided over the overlay network. That is, in OVERLAY_INFO of FIG. 8, overlay-id 811, owner-id 812, and service-info 813 may be fields related to services provided over the HON.

According to an embodiment, the service information on the overlay may include start and end times, a title and description, and the like of a corresponding service. That is, in OVERLAY_SERVICE_INFO of FIG. 8, start-datetime 821, end-datetime 822, title 823, description 824, and channel-list 825 may be fields related to the service. In this case, start-datetime 821 and end-datetime 822 may indicate a start time and an end time of the service, respectively, and channel-list 825 may indicate a list of channels over which the service is provided.

There may also be data channels for configuring the service, and various information such as audio, video, text, or control commands may be transmitted for each channel. According to an embodiment, the type of data transmitted from a channel may be distinguished by channel-type 832, and the type of data for each channel type may be distinguished by channel-data-attribute 833. That is, in OVERLAY_CHANNEL_INFO of FIG. 8, channel-id 831, channel-type 832, and channel-attribute 833 may be fields related to the relationship between detailed data transmission channels in the service. Here, channel-id 831 may indicate an identifier of each channel, and channel-type 832 may indicate a type of each channel.

In this case, a service user may exist as a terminal (i.e., peer) on the HON.

Figure 9:
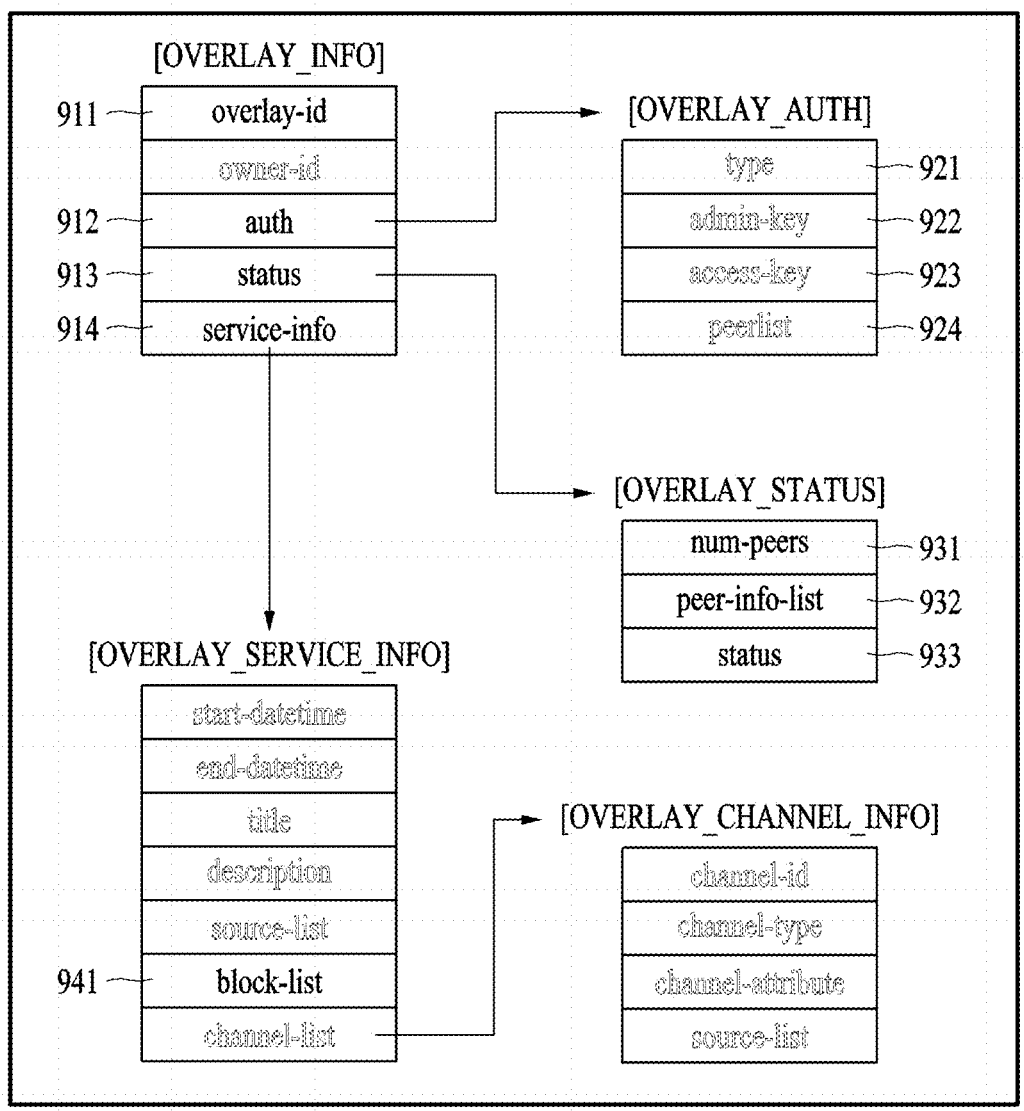

Referring to FIG. 9, illustrated are fields related to information for describing an accessible user in service information (service-info).

The type of overlay network and service may be described through auth 912 in overlay information. For example, an overlay network may be described as "open" in type 921 in auth 912 in the overlay information if it is accessible to all users, and may be described as "closed" if it is accessible only to certain users.

According to an embodiment, an access right of a user to the overlay network and service may be described through access-key 923 and peerlist 924 in the auth 912 in the overlay information and through block-list 941 in the service information.

According to an embodiment, access-key 923 may include an encrypted key that is accessible to the corresponding overlay network and service, and the peerlist 924 may include a list of users that are accessible to the corresponding overlay network and service. In addition, block-list 941 may indicate a list of users that are blocked from accessing the corresponding overlay network and service. The information in block-list 941 may have a higher priority than the information in peerlist 924 or access-key 923, and may be applied regardless of a service type. Here, peerlist 924 or access-key 923 may be applicable when the service type is "closed," and the users listed in peerlist 924 may be accessible even without access-key 923. That is, in a case where peerlist 924 and access-key 923 exist at the same time, the information in peerlist 924 may be applied preferentially.

According to an embodiment, the list of users joining the overlay and service and the status information of the users may be described through peer-info-list 932 and status 933 in status 913 in the overlay information. In this case, the status information of the users may be expressed as "active" and "terminated."

Figure 10:
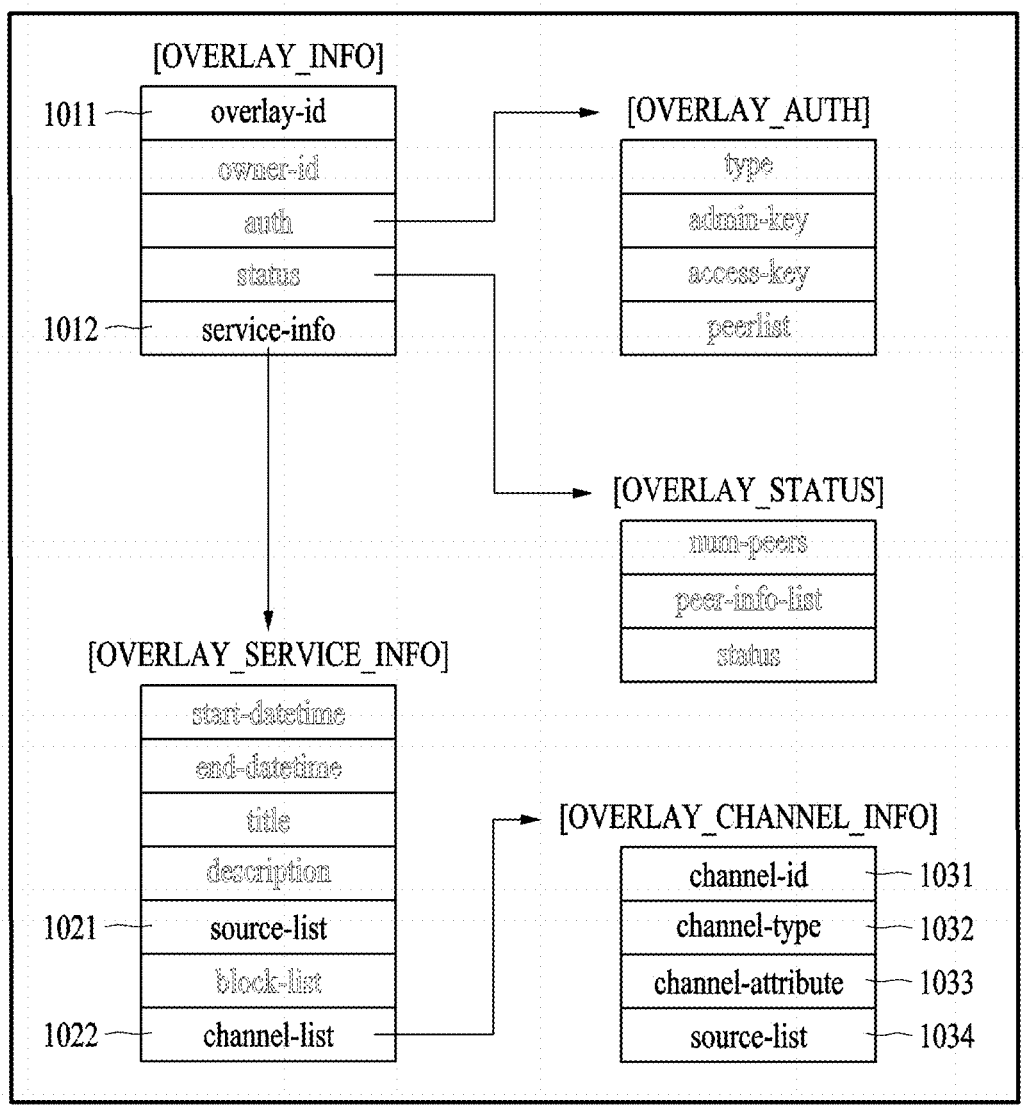

Referring to FIG. 10, illustrated are fields related to a data transmission right of a user for an overlay network and service. The data transmission right may represent a user's right to speak.

As shown, source-list 1021 of service information may include a list of users having the data transmission right to transmit data for the entire service. Here, source-list 1021 of each channel information associated with channel-list 1022 included in the service may include a list of users having the transmission right for a corresponding channel.

The channel information of each channel may include how each channel is organized, a type of each channel, specific attributes of each channel, and a list of users having the data transmission right for each channel. That is, OVERLAY_CHANNEL_INFO may include channel-id 1031, channel-type 1032, channel-attribute 1033, and source-list 1034.

According to an embodiment, in a case where source-list 1021 of the service information and source-list 1034 of the channel information exist at the same time, source-list 1034 of the channel information may have a higher priority, and source-list 1034 of the channel information may be applied to the data transmission right for a corresponding channel. Also, in a case where source-list 1021 of the service information is present but source-list 1034 of the channel information is not present, source-list 1021 of the service information may be applied to the data transmission right for a corresponding channel.

Figure 11:
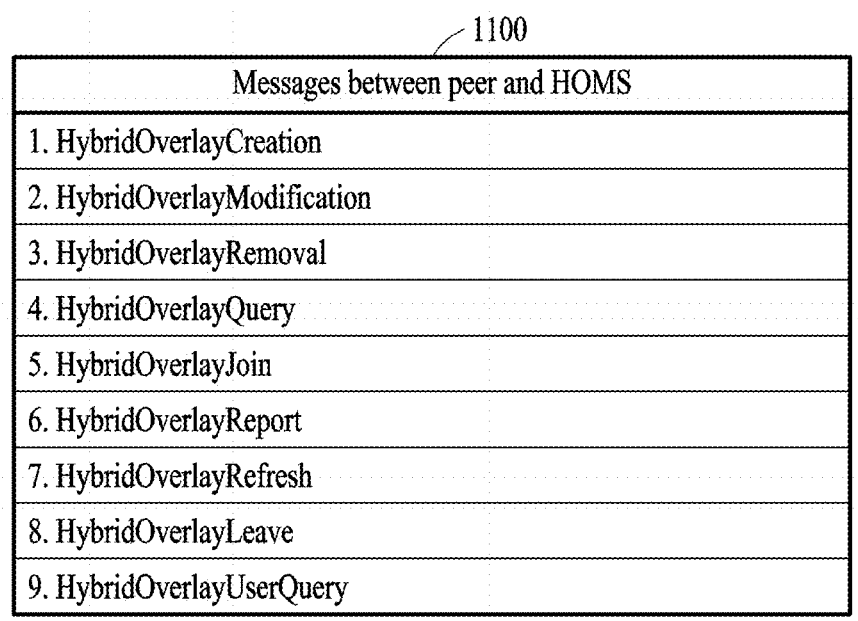
FIG. 11 is a diagram illustrating messages for controlling a service according to an embodiment.

FIG. 11 is a diagram illustrating messages for controlling a service according to an embodiment.

Referring to FIG. 11, illustrated is a list of service control messages 1100 used to control a service between a peer included in a service agent and a HOMS.

As shown in FIG. 11, the service control messages 1100 may include HybridOverlayCreation, HybridOverlayModification, HybridOverlayRemoval, HybridOverlayQuery, HybridOverlayJoin, HybridOverlayReport, HybridOverlayRefresh, HybridOverlayLeave, and HybridOverlayUserQuery, depending on the purpose of control. However, embodiments are not limited thereto, and the service control messages 1100 for various purposes may be used by the HOMS.

Of the service control messages 1100, HybridOverlayCreation, HybridOverlayQuery, HybridOverlayModification, and HybridOverlayRemoval may be messages that may be requested by a service owner. Also, of the service control messages 1100, HybridOverlayJoin, HybridOverlayReport, HybridOverlayRefresh, HybridOverlayLeave, and HybridOverlayUserQuery may be messages that may be requested by any user, including the service owner.

In this case, HybridOverlayCreation may be used to create a new HON and service. HybridOverlayQuery may be used to retrieve general information about the HON and service. HybridOverlayModification may be used by the service owner to modify attributes of the HON and service.

In addition, HybridOverlayJoin may be used by a service user to join the existing HON and service. The service owner may also use HybridOverlayJoin to join the service in the same way as the service user. HybridOverlayReport may be used by the service user to report status information to the HOMS. HybridOverlayRefresh may be used by the service user to extend the time to maintain the HON and service. HybridOverlayLeave may be used by the service user to leave the HON and service with an explicit notification. HybridOverlayUserQuery may be used to retrieve information (e.g., public key, etc.) about a specific user from the HON and service. HybridOverlayRemoval may be used by the service owner to remove the HON and service.

The service control messages 1100 may be based on messages defined in, for example, a hybrid overlay management protocol, and may be extended for a feature-based video service. In addition, for example, since the hybrid overlay management protocol runs on top of a hypertext transfer protocol (HTTP), it may thus follow the semantics and syntax of the HTTP.

In an embodiment, the service owner, which is a service creator, may be the same as an owner of the overlay, and the service user, which is a service participant, may be the same as a peer of the overlay.

The operations and messages for creating and modifying services are described in more detail below with reference to FIGS. 12 through 21.

Figure 12:
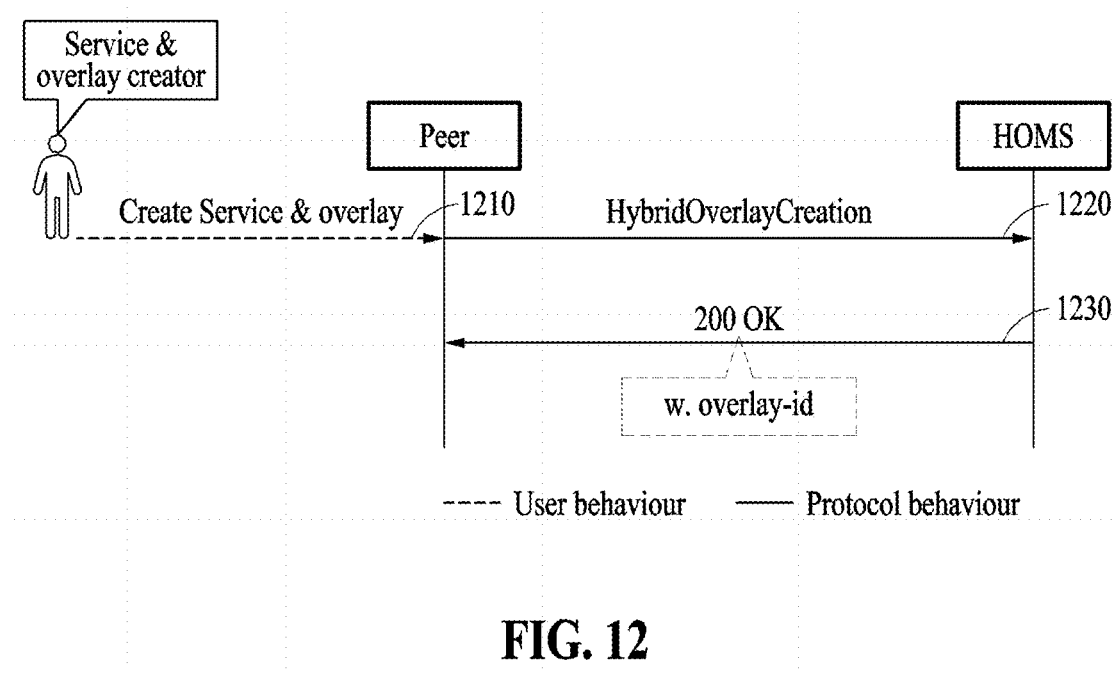
FIG. 12 is a diagram illustrating an operation of creating a service according to an embodiment.

FIG. 12 is a diagram illustrating an operation of creating a service according to an embodiment.

Referring to FIG. 12, illustrated is an example information flow between a HOMS and a peer of a service creator to create a service and overlay.

A HybridOverlayCreation message may be used to create a new HON and a service that uses the HON.

According to an embodiment, the service creator may transmit a HybridOverlayCreation request message to the HOMS to create a new feature-based video service over the HON. The service creator may retain ownership of the service and may have a right to modify or remove the service.

At operation 1210, the service creator may request the creation of an HON and service to a service peer via a service client.

At operation 1220, the service creator may transmit a HybridOverlayCreation request message to create a new feature-based video service over the HON, and may specify attributes of the overlay network and service by using parameters of the message. That is, the peer of the service creator may transmit, to the HOMS, the request for the creation of the overlay network and service by transmitting the parameters of the attributes of the overlay network and service specified by the service creator.

At operation 1230, upon receiving the HybridOverlayCreation message, the HOMS may create the requested HON and service and, when successful creating, may transmit the network and service attribute information including a newly issued overlay-id to the peer of the service owner through a 200 OK response. That is, in response to the creation request, the HOMS may create the HON and service, and transmit the network and service information including the overlay identifier to the peer of the service creator.

FIG. 13 is a diagram illustrating a service creation request message according to an embodiment.

Referring to FIG. 13, illustrated is an example syntax of a creation request message 1300 for creating an HON and service. For example, a syntax of a HybridOverlayCreation request message is shown.

Referring to FIGS. 13 through 21, the following notation may be used in the body of an HTTP request or response message to express a requirement for a particular parameter.
m: mandatory
o: optional
c: conditional mandatory In addition, the requirement for the parameter may vary depending on a context in which the message is used.

In overlay information, an owner identifier (owner-id), authentication (auth), type, and service information (service-info) may be mandatory. A service type of a service to be established may be specified in an auth field and, for the service type, "closed" and "open" may be available. In an embodiment, a default value of the service type may be "open."

Type and admin-key in auth may be required to be included in the request message, and access-key and peerlist in auth may be conditionally included.

In addition, in a case where the request message has a value "closed" for type in auth, one of access-key and peerlist in auth may be required to be included in the request message. In a case where the request message has both access-key and peerlist in auth, the HOMS may use a value of access-key to determine whether the requestor is authorized to create the overlay.

FIG. 14 is a diagram illustrating service information of a service creation request message according to an embodiment.

Referring to FIG. 14, illustrated is an example syntax of service information 1400 in a HybridOverlayCreation request message to create an overlay and service.

The service information 1400 may include a list (source-list) of peers having a transmission right associated with controlling access right to the service, a list (block-list) of peers that are blocked from joining the service, and a list (channel-list) of channels included in the service. In this case, the block-list of peers blocked from joining the service may be specified regardless of a service type. That is, the block-list of the blocked peers may be specified not only when the service type is closed, but also when the service type is open.

The channel-list may also include how each channel is configured (channel-id), a type of each channel (channel-type), and a list of peers having a data transmission right for each channel (source-list).

According to an embodiment, the channel identifier (channel-id) and the channel type (channel-type) fields of the channel-list of channels in the service information 1400 may be mandatory, and the source-list field, which is the field of the list of peers having the transmission right, may be optional. The channel identifier (channel-id) may be the only identifier in a corresponding overlay identifier (overlay-id) and may be assigned by a service owner (i.e., service creator).

FIG. 15 is a diagram illustrating a response message to service creation according to an embodiment.

Referring to FIG. 15, illustrated is an example syntax of a response message 1500 in response to an HON and service creation request. For example, a syntax of a HybridOverlayCreation response message is shown.

In overlay information, an overlay identifier (overlay-id), type, owner identifier (owner-id), and service information (service-info) may be mandatory, and authentication (auth) information may be conditional.

Type and admin-key in auth may be required to be included in the response message, and access-key and peerlist in auth may be conditionally included or not. In addition, in a case where the request message has a value "closed" for type in auth, one of access-key and peerlist in auth may be required to be included in the response message. In a case where both access-key and peerlist are included in the request message, the HOMS may use a value of access-key to determine whether the requestor is authorized to create the overlay.

FIG. 16 is a diagram illustrating service information of a response message to service creation according to an embodiment.

Referring to FIG. 16, illustrated is an example syntax of service information 1600 of a HybridOverlayCreation response message.

According to an embodiment, if start-datetime is not included in a request message, the start-datetime of service-info may reflect the time the request message is received.

According to an embodiment, if end-datetime is not included in the request message, it may be treated as 86,400 seconds (e.g., 1 day) and the end-datetime of service-info may reflect this time.

According to an embodiment, if title and description are included in the request message, those fields should be included in a response message. However, if title and description are not included in the request message, they do not need to be included in the response message.

According to an embodiment, if source-list is not included in the request message, the HOMS may assume that no user is authorized to send data for all channels within the service, and may assign a list with no value to the source-list field in the response message.

According to an embodiment, if block-list is not included in the request message, the HOMS may assume that there are no users who cannot participate in the service, and may assign a list with no value to the block-list field in the response message.

For example, the channel-id and channel-type fields in the channel-list may be mandatory, and the response message may apply the channel-id and channel-type fields of the request message. The source-list field in the channel-list may be optional. In addition, according to an embodiment, if the channel-id assigned by the service owner does not guarantee uniqueness within a corresponding overlay-id, the HOMS may generate a new channel-id that guarantees the uniqueness and assign it to the HybridOverlayCreation response message.

According to an embodiment, a data transmission right (or permission) for each channel may have a higher priority than the priority for all channels in the service. In other words, the source-list field in the channel-list may be applied preferentially over the source-list field in the service-info.

According to an embodiment, if the source-list field in the channel-list of the request message has a list with no value, the HOMS may assume that all peers are not authorized to send on a corresponding channel.

According to an embodiment, if there is no source-list field in the channel-list of the request message, but the source-list field of the service-info exists, the HOMS may apply the source-list of the service-info to the source-list of the channel-list. In this case, the source-list field in the channel-list of the response message may not include nothing.

According to an embodiment, if there is no source-list field in the channel-list of the request message and there is no source-list field in the service-info, the HOMS may assume that the source-list of the channel-list has a list with no value. In other words, the HOMS may apply the source-list of the service-info. In this case, the source-list in the channel-list of the response message may include nothing.

Figure 17:
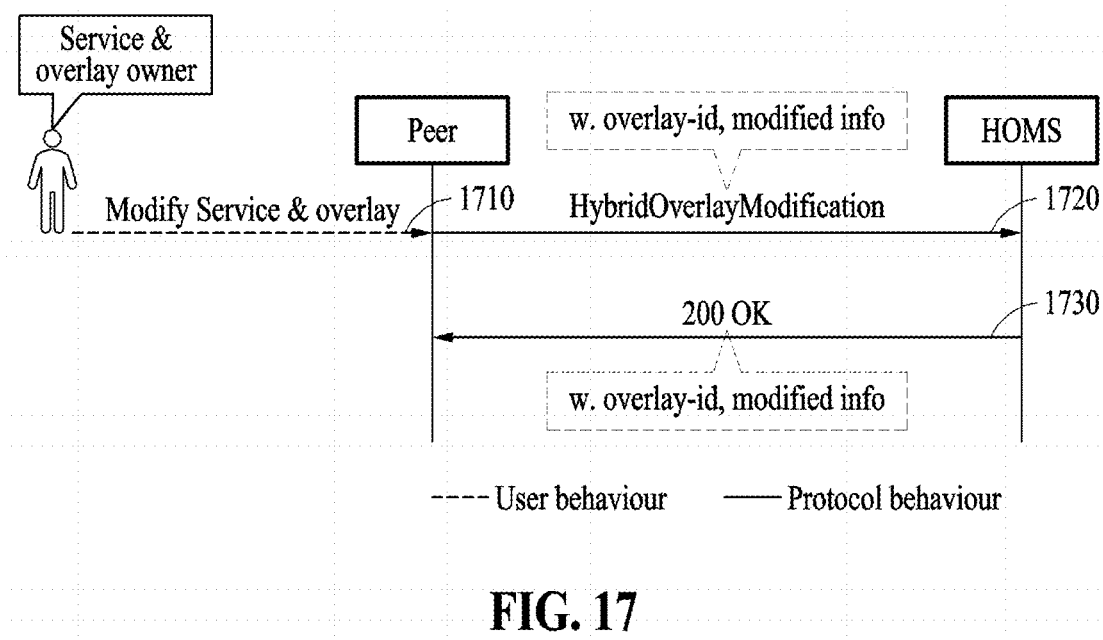
FIG. 17 is a diagram illustrating an operation of modifying an HON and service information according to an embodiment.

FIG. 17 is a diagram illustrating an operation of modifying an HON and service information according to an embodiment.

Referring to FIG. 17, illustrated is an example information flow between a peer of a service owner and a HOMS to modify a service through an HON.

A HybridOverlayModification message may be used by the service owner to modify the details of an HON and service. If a modification requestor is an owner of the overlay and service, the HOMS may accept such a modification request for the overlay and service. In other words, if the modification requestor is the owner of the overlay and service, and an admin-key is the same as the information managed by the HOMS, the modification may be available.

At operation 1710, the service owner may send an HON and service modification request to a service peer via a service client.

At operation 1720, the peer of the service owner may transmit a HybridOverlayModification request message to the HOMS to modify attributes of a feature-based video service and an HON. The overlay service owner may modify HON information including, for example, title, description, and authentication, and the start date, end date, data transmission rights, and participation rights.

According to embodiment, the updated information may be immediately reflected in the HOMS but may not be applied to peers of service users that have already been joined (participated). Through periodic updates by the peers of the service users, the peers may receive the latest information.

At operation 1730, upon receiving the HybridOverlayModification message, the HOMS may transmit detailed information about the overlay and service to the peer of the service owner to verify a result of the modification made by the service owner.

FIG. 18 is a diagram illustrating an HON and service information modification request message according to an embodiment.

Referring to FIG. 18, illustrated is an example syntax of an HON and service modification request message 1800 for modifying an HON and service. For example, a syntax of a HybridOverlayModification request message is shown.

According to an embodiment, if the requestor is an owner of the overlay and an admin-key matches information managed by the HOMS, the HOMS may allow a modification request for the overlay and ownership. In other words, if the requestor is the owner of the overlay and the admin-key is the same as the information stored in the HOMS, the modification may be made. If an owner-id field of the overlay indicates the owner of the overlay, and an admin-key in auth is the same as the information stored in the HOMS, all fields in the service-info may be modifiable.

In addition, ownership information (ownership) may also be modifiable. In other words, if the owner-id and admin-key values of the request message are the same as the owner-id and admin-key values of the corresponding overlay managed by the HOMS, the ownership may be modifiable. In this case, when comparing the owner-id in the request message to the owner-id managed by the HOMS, they may be considered identical if the user-id is the same. This may be accomplished by modifying the owner-id and admin-key values managed by the HOMS to the owner-id and admin-key values in the request message.

It may also be possible for an existing owner to transfer the ownership by modifying the owner-id. A new owner receiving the transfer of the ownership may modify the admin-key through a HybridOverlayModification message.

FIG. 19 is a diagram illustrating service information of an HON and service information modification request message according to an embodiment.

Referring to FIG. 19, illustrated is an example syntax of service information 1900 in a HybridOverlayModification request message.

If an owner-id of the overlay and an admin-key in auth match the corresponding information managed by the HOMS for the overlay, all fields in the service-info may be modifiable. For a channel-list, only a source-list may be modified.

FIG. 20 is a diagram illustrating a response message to service information modification according to an embodiment.

Referring to FIG. 20, illustrated is an example syntax of a response message 2000 to an HON and service modification request. For example, a syntax of a HybridOverlayModification response message is shown.

According to an embodiment, if an owner-id and an admin-key in a request message match an owner-id and an admin-key of a corresponding overlay managed by the HOMS, the HOMS may replace ownership information of the overlay managed by the HOMS itself with ownership information (the owner-id and admin-key) in the request message. The HOMS may then assign the modified ownership information to the owner-id and admin-key of auth in the response message 2000.

FIG. 21 is a diagram illustrating service information of a response message to service information modification according to an embodiment.

Referring to FIG. 21, illustrated is an example syntax of service information 2100 of a HybridOverlayModification response message.

According to an embodiment, if there is field information included in service-info of a request message, the HOMS may reflect the field information in an appropriate overlay managed by the HOMS itself and assign the modified information to a response message. In an embodiment, each field in the service-info may be included only if it has modified information.

Figure 22:
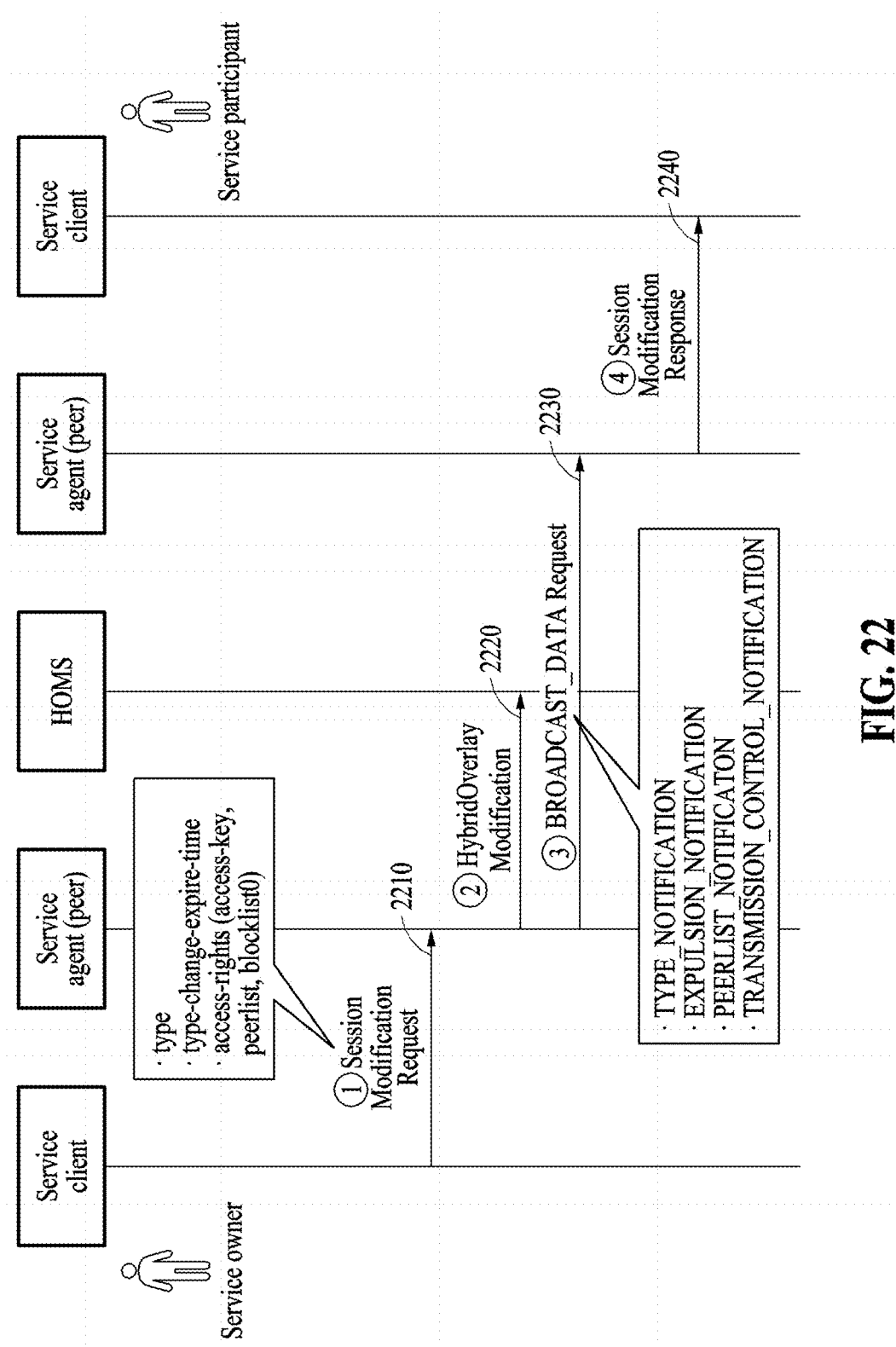
FIG. 22 is a diagram illustrating an operation of changing a service type and an access right of a service user according to an embodiment.

FIG. 22 is a diagram illustrating an operation of changing a service type and an access right of a service user according to an embodiment.

At operation 2210, a service owner may transmit a session information modification request (indicated as "Session Modification Request" in FIG. 22) including a service type and a user access right according to the service type to a service agent (including a peer) via a service client. In this case, the request may include a type change time required to change the type.

At operation 2220, a peer included in the service agent of the service owner may transmit, to a HOMS managing overlay information, a request (indicated as "HybridOverlayModification" in FIG. 22) for modifying a service type, a user access right, or a data transmission right (or permission).

At operation 2230, the peer of the service owner may transmit, to peers of all participants in the service, a message (indicated as "BROADCAST_DATA" in FIG. 22) including information about which one of the service type or access right has been modified.

At operation 2240, a peer of a service participant receiving, from the peer of the service owner, a notification message notifying that the service type or access right has been modified may transmit a message (indicated as "Session Modification Response" in FIG. 22) to the service client to notify the modification.

According to an embodiment, detailed information of the Session Modification Request for the service owner to request the modification of the service type from the peer at operation 2210 may be as shown in Table 4 below.

TABLE 5

| Parameter | Description |
| --- | --- |
| type | type may indicate information about a service type to be modified. It may be included when changing the service type. |
| type-change-expire-time | type-change-expire-time, which refers to a time required for the modification of the service, may indicate the time used for the HOMS, which is a server managing an overlay and service information, to apply a type modification request from a service owner. However, this may be omitted according to embodiments. |
| access-rights | access-rights may include an access-key and a peerlist in auth of overlay-info and include a block-list of service-info, and may also include information of users allowed for a corresponding service and blocked from the service. In this case, either the access-key or the peerlist may be specified to specify the users allowed for the service. If both the access-key and the peerlist exist, the peerlist may be used. |

According to an embodiment, if the service owner intends to change the service to one accessible to anyone, they may send a service type modification request to the service agent by specifying the service type as "open." In this case, the following may apply.

In a case of changing the service type to open, a default value for the type change time may be zero (0). In other words, when the HOMS receives a HybridOverlayModification message from the peer of the service owner, it may immediately apply the "open" service type.

In a case of changing the service type to open, because the HOMS does not apply the access-key and the peerlist of the auth of the overlay-info, which is the information, of the user access right, about the users allowed to access the service, it may not need to describe related information. In other words, the HOMS may allow all users who request to join, without checking the access-key and the peerlist of the auth of the overlay-info.

Even in a case of changing the service type to open, but describing the information of users blocked from access to the service, a block-list of the service-info may be included. Even if the service type is open, the HOMS may apply the block-list of the service-info. In other words, participants included in the block-list may be restricted from joining even if they are requested to join.

According to an embodiment, if the service owner intends to allow only authorized (allowed) users to access the service, the service owner may send a service type change request to the service agent by specifying the service type as closed. In this case, the following may apply.

In a case of changing the service type to closed, the type change time may be specified. In other words, when the HOMS receives a HybridOverlayModification message from the peer of the service owner, the type change time may indicate a time required to change the service type to closed.

In a case of changing the service type to closed, because the HOMS applies the access-key and the peerlist of the auth of the overlay-info, which is the information, of the user access right, about users allowed for the service, it may not need to describe related information. In this case, if there is no additional information, the existing information stored in the corresponding overlay may be used.

In a case of changing the service type to closed, and describing the information of users blocked from access to the service, a block-list of the service-info may be included. The block-list may be applied preferentially over the service type, the access-key, and the peerlist.

According to an embodiment, a modification of service type information requested by the peer of the service owner to the HOMS may be made through a HybridOverlayModification message.

A HybridOverlayModification request message for requesting the modification of the service type may follow the syntax shown in FIG. 18, with specific information as follows.

The service type to be changed may be reflected in type in auth.

Access right information for authorized users may be reflected in access-key or peerlist in auth.

Access right information for blocked users may be reflected in block-list in service-info.

A HybridOverlayModification response message including a result of processing the service type modification request may follow the syntax shown in FIG. 20, with specific information as follows.

If the service type has changed, the changed service type may be included.

If the access right information for the authorized users has been modified, the modified access right information may be included.

If the access right information for the blocked users has been modified, the modified access right information for the blocked users may be reflected.

Figure 23:
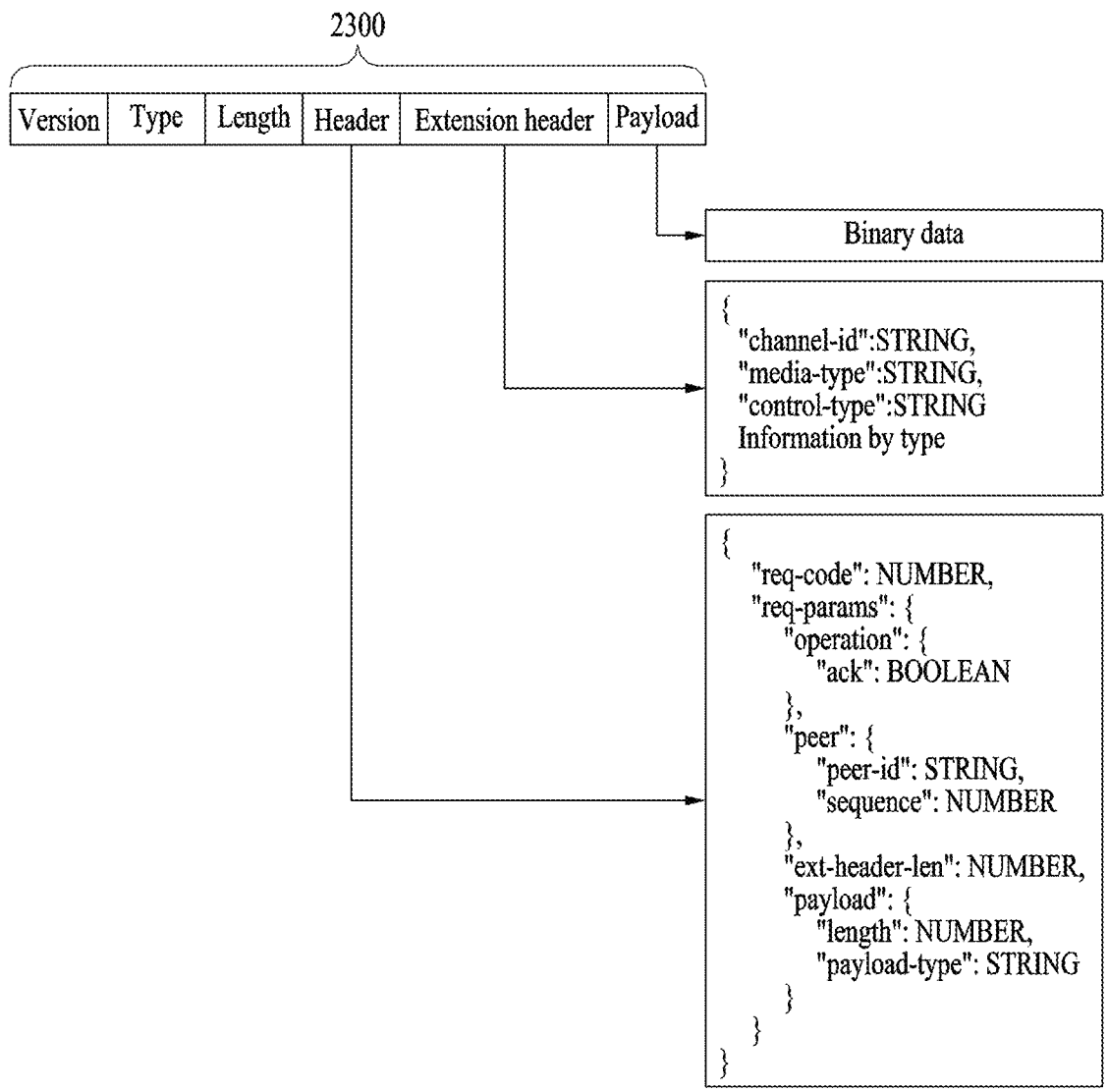
FIG. 23 is a diagram illustrating a message indicating that service information has been modified according to an embodiment.

FIG. 23 is a diagram illustrating a message indicating that service information has been modified according to an embodiment.

Referring to FIG. 23, illustrated are a format and detailed information of a BROADCAST_DATA message 2300 that notifies, by a peer of a service owner, peers of all participants in an overlay and service that an access right service type has changed.

The BROADCAST-DATA message 2300 may include a control type (control-type) including service information modification. The control-type may include TYPE_NOTIFICATION for notifying a change in service type, EXPULSION_NOTIFICATION for notifying a change in blocked participant list, PEERLIST_NOTIFICATON for notifying a change in allowed participant list, or TRANSMISSION_CONTROL_NOTIFICATION for notifying a change in data transmission right participant list, which may be separately included as detailed types.

The BROADCAST-DATA message 2300 may be transmitted over a channel that transmits service control information between peers. According to an embodiment, a data transmission right for a service control channel may be restricted only to the service owner to prevent arbitrary service control by any user.

The BROADCAST-DATA message 2300 may have different extension header field information according to a type of service information modification.

FIG. 24 is a diagram illustrating a type-specific structure of a service according to an embodiment.

Referring to FIG. 24, illustrated is example structure information of an extension header of TYPE_NOTIFICATION 2410, EXPULSION_NOTIFICATION 2420, PEERLIST_NOTIFICATON 2430, and TRANSMISSION_CONTROL_NOTIFICATION 2440, as a service control notification type.

Figure 25:
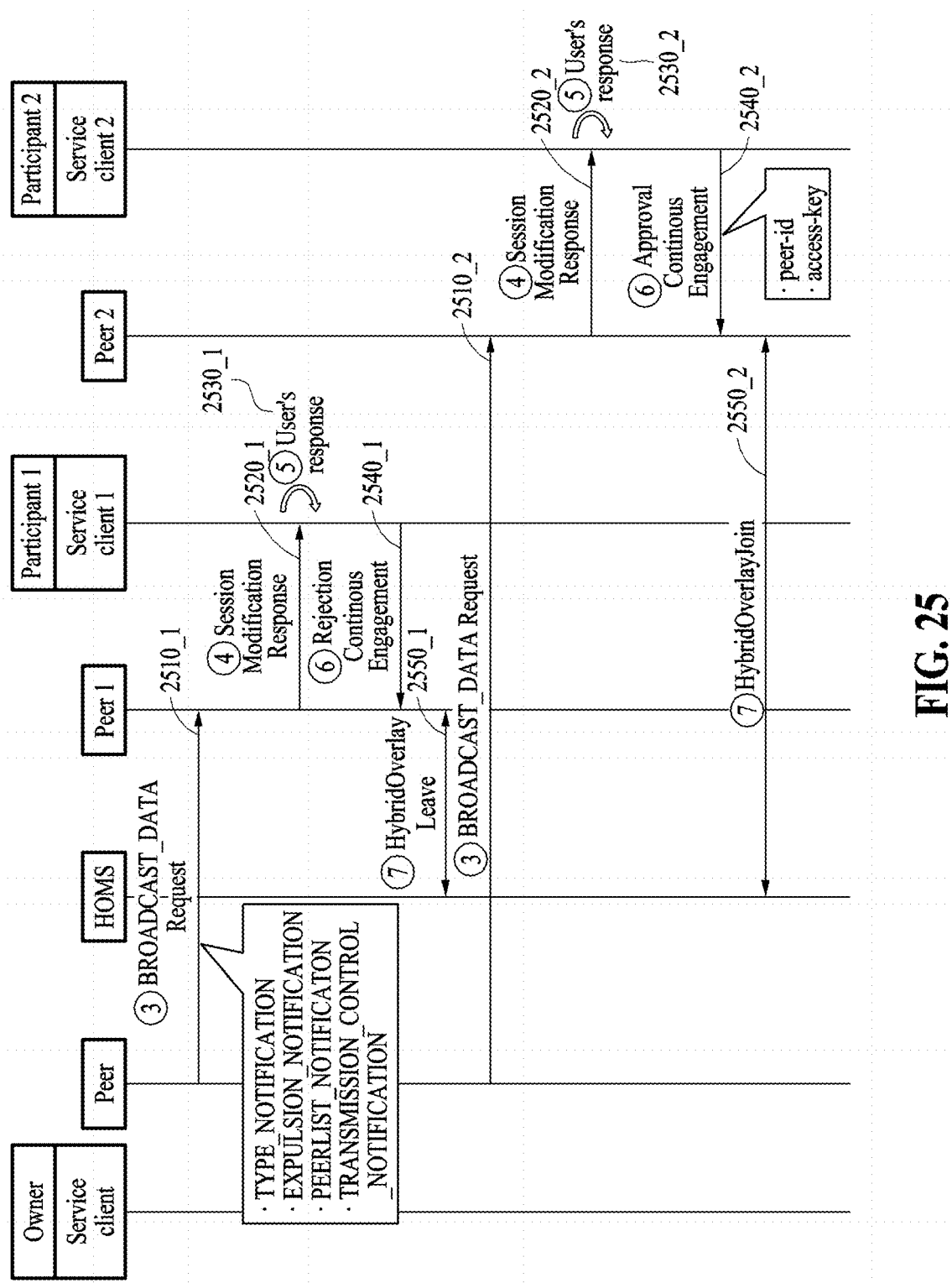
FIG. 25 is a diagram illustrating an operation of a peer of a service participant upon receiving a message indicating that service information has been modified, according to an embodiment.

FIG. 25 is a diagram illustrating an operation of a peer of a service participant upon receiving a message indicating that service information has been modified, according to an embodiment.

Referring to FIG. 25, illustrated is an example processing procedure performed by a peer of a service participant after receiving a BROADACAST_DATA message including service control information, such as, a service type and a user access right or data transmission right, originating from a peer of a service owner.

The peer receiving the BROADACAST_DATA message may notify the service participant that the service type or access right service type, or the user access right has changed, and allow existing participants to make various decisions on, for example, continuing to participate or leaving, based on the change in the service type or access right. This may allow the service owner to maintain the changed type and a list of participants allowed for the access. In this description, the service participant may also be referred to as a participant for case of explanation.

In FIG. 25, operations 2510_1, 2520_1, 2530_1, 2540_1, and 2550_1 may represent operations of a peer of participant 1, and operations 2510_2, 2520_2, 2530_2, 2540_2, and 2550_2 may represent operations of a peer of participant 2 different from participant 1.

At operations 2510_1 and 2510_2, a peer of a participant may receive, from a peer of a service owner, a BROADCAST_DATA message including a service information modification notification notifying that a service type or access right has been modified.

At operations 2520_1 and 2520_2, the peer of the participant may transmit (forward) this information to a service client through a Session Modification Response message to allow the participant to verify the modified service and access control information.

At operations 2530_1 and 2530_2, the participant may determine whether to continue joining the service or leave the service after verifying the modified service and access control information.

At operations 2540_1 and 2540_2, the service client of the participant may transmit the decision of the participant to the peer.

At operations 2550_1 and 2550_2, based on the decision of the participant, the peer of the participant may transmit a HybridOverlayLeave message or a HybridOverlayJoin message to the HOMS. If the participant does not intend to continue joining the service and the participant is included in the modified service access information, the peer of the participant may leave the service through the HybridOverlayLeave message. If the participant intends to continue joining the service and the participant is not included in the modified service access information, the peer of the participant may continue joining the service through the HybridOverlayJoin based on the service type and access right information associated with the service.

Figure 26:
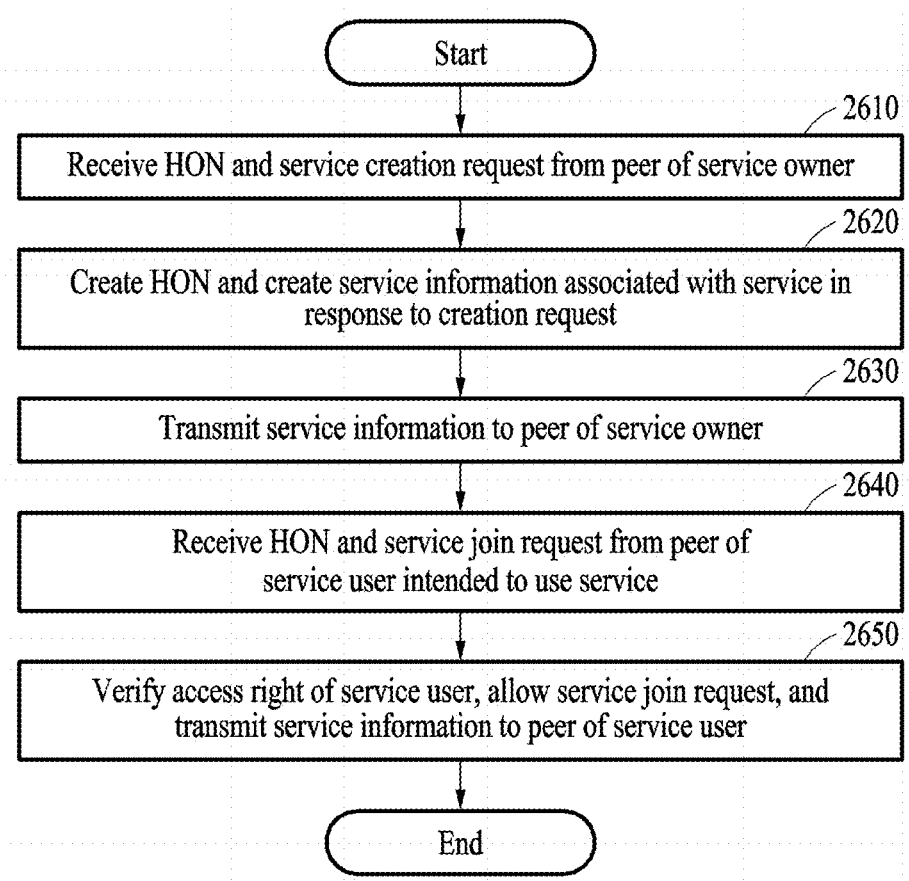
FIG. 26 is a schematic flowchart illustrating operations of a HOMS that manages a service of an HON according to an embodiment.

FIG. 26 is a schematic flowchart illustrating operations of a HOMS that manages a service of an HON according to an embodiment.

In the following embodiments, operations may be performed in sequential order but may not be necessarily performed in sequential order. For example, the order of the operations may be changed, and at least two of the operations may be performed in parallel. Operations 2610 through 2650 may be performed by at least one component (e.g., a processor, etc.) of the HOMS.

At operation 2610, the HOMS may receive an HON and service creation request from a peer of a service owner.

At operation 2620, in response to the creation request, the HOMS may create an HON and create service information of a service. The HOMS may determine attributes of the HON and the service, using parameters included in the creation request. The HOMS may determine at least one of a service type of the service or an access right of each user, using the parameters included in the creation request. The HOMS may determine that a data transmission right for each channel has a higher priority than a data transmission right assigned collectively to all channels in the service.

At operation 2630, the HOMS may transmit the service information to the peer of the service owner.

At operation 2640, the HOMS may receive an HON and service join request from a peer of a service user who intends to use the service.

At operation 2650, the HOMS may verify an access right of the service user, allow the service join request, and transmit the service information to the peer of the service user.

If the service information has been modified, the HOMS may transmit the modified service information to the peer of the service user in response to an information retrieval request from the service user.

In this case, the HON may be a P2P overlay network that allows data to be exchanged among joined peers.

The service may be provided to the peer of the joined service user through the HON. The service type may include open and closed according to whether the access right is required to use the service. In terms of the access right, the service information may include a list of peers having a transmission right, a list of peers that are blocked from joining, and a list of channels included in the service. The service may include a feature-based video service.

What has been described above with reference to FIGS. 1 through 24 may be applied to each of the operations illustrated in FIG. 26 without a change, and thus a more detailed description will be omitted.

Figure 27:
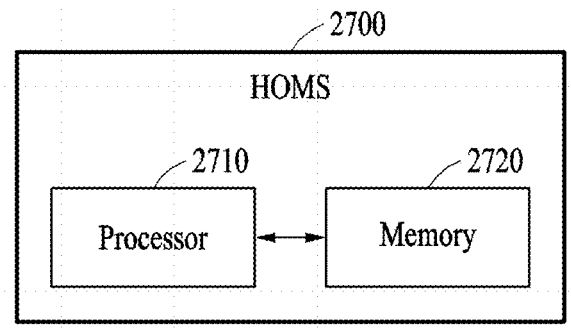
FIG. 27 is a schematic block diagram illustrating a HOMS that manages a service of an HON according to an embodiment.

FIG. 27 is a schematic block diagram illustrating a HOMS that manages a service of an HON according to an embodiment.

Referring to FIG. 27, a HOMS 2700 may include a processor 2710. The processor 2710 may include at least one processor. The HOMS 2700 may further include a memory 2720.

The memory 2720 may store instructions (e.g., program) executable by the processor 2710. For example, the instructions may include instructions for executing operations of the processor 2710 and/or instructions for executing operations of each component of the processor 2710.

The processor 2710, which is a device configured to execute the instructions or the program or to control the HOMS 2700, may include various processors, such as, for example, a central processing unit (CPU), a graphics processing unit (GPU), and the like. The processor 2710 may receive, from a peer of a service owner, an HON and service creation request to create an HON and a service. In response to the creation request, the processor 2710 may create the HON and create service information of the service. The processor 2710 may transmit the service information to the peer of the service owner. The processor 2710 may receive, from a peer of a service user who intends to use the service, an HON and service join request to join the HON and the service. The processor 2710 may verify an access right of the service user, allow the service join request, and transmit the service information to the peer of the service user.

Using parameters included in the creation request, the processor 2710 may determine attributes of the HON and the service. Using the parameters included in the creation request, the processor 2710 may determine at least one of a service type of the service or an access right of each user. The processor 2710 may determine a data transmission right for each channel to have a higher priority than a data transmission right assigned collectively to all channels in the service. When the service information has been modified, the processor 2710 may transmit the modified service information to the peer of the service user in response to an information retrieval request from the service user.

The HOMS 2700 may also perform the other operations described above.

The embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as, parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as ROM, RAM, flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating a hybrid overlay management server (HOMS), the method comprising:
   receiving a creation request for creating a hybrid overlay network (HON) and a service from a peer of a service owner;
   in response to the creation request, creating the HON and creating service information of the service;
   transmitting the service information to the peer of the service owner;
   receiving a join request for joining the HON and the service from a peer of a service user who intends to use the service; and
   verifying an access right of the service user, allowing the join request, and transmitting the service information to the peer of the service user,
   wherein the HON is a peer-to-peer (P2P) overlay network over which joined peers exchange data, and
   the service is provided to the peer of the joined service user through the HON.

2. The method of claim 1, wherein the creating of the service information comprises:
   determining attributes of the HON and the service, using parameters comprised in the creation request.

3. The method of claim 1, wherein the creating of the service information comprises:
   determining at least one of a service type of the service or a user-specific access right, using parameters comprised in the creation request,
   wherein the service type comprises an open type and a closed type based on whether an access right is required to use the service.

4. The method of claim 1, wherein the service information comprises:
   a list of peers having a transmission right, a list of peers blocked from participation, and a list of channels configuring the service, in connection with the access right.

5. The method of claim 1, wherein the creating of the service information comprises:
   determining a priority of a data transmission right for each channel to be higher than that of a data transmission right assigned collectively to all channels in the service.

6. The method of claim 1, further comprising:
   when the service information is created, transmitting the created service information to the peer of the service user in response to an information retrieval request from the service user.

7. The method of claim 1, wherein the service comprises: a feature-based video service.

8. A method of operating a hybrid overlay management server (HOMS), the method comprising:
   receiving a modification request for modifying service information provided through a hybrid overlay network (HON) from a peer of a service owner;
   in response to the modification request, verifying a modification right of the service owner for the service information;
   in response to the modification right being present, modifying the service information according to the modification request; and
   in response to the service information being retrieved by a peer of a service user joining the service, transmitting the retrieved service information to the peer of the service user,
   wherein the HON is a peer-to-peer (P2P) overlay network over which joined peers exchange data, and
   the peer of the service owner transmits, to the peer of the service user, a message indicating that access control information of the service has been modified.

9. The method of claim 8, wherein the modifying of the service information comprises:

modifying at least one of a start time, an end time, a data transmission right, and a service join right of the HON, according to the modification request.

10. The method of claim 8, wherein the modifying of the service information comprises:
changing a service type of the service from an open type to a closed type, or from the closed type to the open type.

11. The method of claim 8, wherein the modifying of the service information comprises:
in response to the service type being changed from a closed type to an open type, allowing a join request from the peer of the service user without verifying an access-key of the service user and a list of peers having an access right; and
in response to the service type being changed from the open type to the closed type, applying, to the service, the access-key and the list of peers having the access right.

12. The method of claim 8, wherein the peer of the service owner transmits, to the peer of the service user, at least one of the following:
a message indicating that the service type has changed, a message indicating that a list of peers blocked from joining has changed, a message indicating that a list of peers allowed to join has changed, and a message indicating that a list of peers having a data transmission right has changed.

13. A hybrid overlay management server (HOMS), comprising:
a processor; and
a memory storing instructions,
wherein, when executed by the processor, the instructions cause the HOMS to:
receive a creation request for creating a hybrid overlay network (HON) and a service from a peer of a service owner;
in response to the creation request, create the HON and create service information of the service;
transmit the service information to the peer of the service owner;
receive a join request for joining the HON and the service from a peer of a service user who intends to use the service; and
verify an access right of the service user, allow the join request, and transmit the service information to the peer of the service user,
wherein the HON is a peer-to-peer (P2P) overlay network over which joined peers exchange data, and
the service is provided to the peer of the joined service user through the HON.

14. The HOMS of claim 13, wherein, when executed by the processor, the instructions cause the HOMS to:
determine attributes of the HON and the service, using parameters comprised in the creation request.

15. The HOMS of claim 13, wherein, when executed by the processor, the instructions cause the HOMS to:
determine at least one of a service type of the service or a user-specific access right, using parameters comprised in the creation request,
wherein the service type comprises an open type and a closed type based on whether an access right is required to use the service.

16. The HOMS of claim 13, wherein the service information comprises:
a list of peers having a transmission right, a list of peers blocked from joining, and a list of channels configuring the service, in connection with the access right.

17. The HOMS of claim 13, wherein, when executed by the processor, the instructions cause the HOMS to:
determine a priority of a data transmission right for each channel to be higher than that of a data transmission right assigned collectively to all channels in the service.

18. The HOMS of claim 13, wherein, when executed by the processor, the instructions cause the HOMS to:
in response to the service information being modified, transmit the modified service information to the peer of the service user in response to an information retrieval request from the service user.

19. The HOMS of claim 13, wherein the service comprises:
a feature-based video service.

20. A non-transitory computer-readable recording medium storing a computer program executing the method of claim 1.

* * * * *